US008699565B2

(12) United States Patent
Mukherjee

(10) Patent No.: US 8,699,565 B2
(45) Date of Patent: Apr. 15, 2014

(54) METHOD AND SYSTEM FOR MIXED-RESOLUTION LOW-COMPLEXITY INFORMATION CODING AND A CORRESPONDING METHOD AND SYSTEM FOR DECODING CODED INFORMATION

(75) Inventor: Debargha Mukherjee, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 926 days.

(21) Appl. No.: 12/549,091

(22) Filed: Aug. 27, 2009

(65) Prior Publication Data

US 2011/0050935 A1    Mar. 3, 2011

(51) Int. Cl.
*H04N 7/12* (2006.01)
*H04N 11/02* (2006.01)
*H04N 11/04* (2006.01)

(52) U.S. Cl.
USPC ............. 375/240.01; 375/240.26; 375/240.28

(58) Field of Classification Search
USPC ............................ 375/240.01, 240.26, 240.28
See application file for complete search history.

(56) References Cited

U.S. PATENT DOCUMENTS

| 7,777,790 B2* | 8/2010 | Feuer et al. ................... 348/239 |
| 7,956,930 B2* | 6/2011 | Sullivan ....................... 348/581 |
| 8,184,712 B2* | 5/2012 | Mukherjee ............... 375/240.21 |

* cited by examiner

Primary Examiner — Geepy Pe

(57) ABSTRACT

Method and system embodiments of the present invention are directed to information compression by information-coding subsystems within computationally-constrained information sources, efficient information transmission through electronic communications media to information sinks with relatively large computational bandwidths. One embodiment of the present invention is directed to a method and system for low-complexity, mixed-resolution information coding by low-powered, computationally constrained distributed sensors which provide continuous video images through wireless communications to a computer-system information sink where the coded information is decoded.

11 Claims, 35 Drawing Sheets

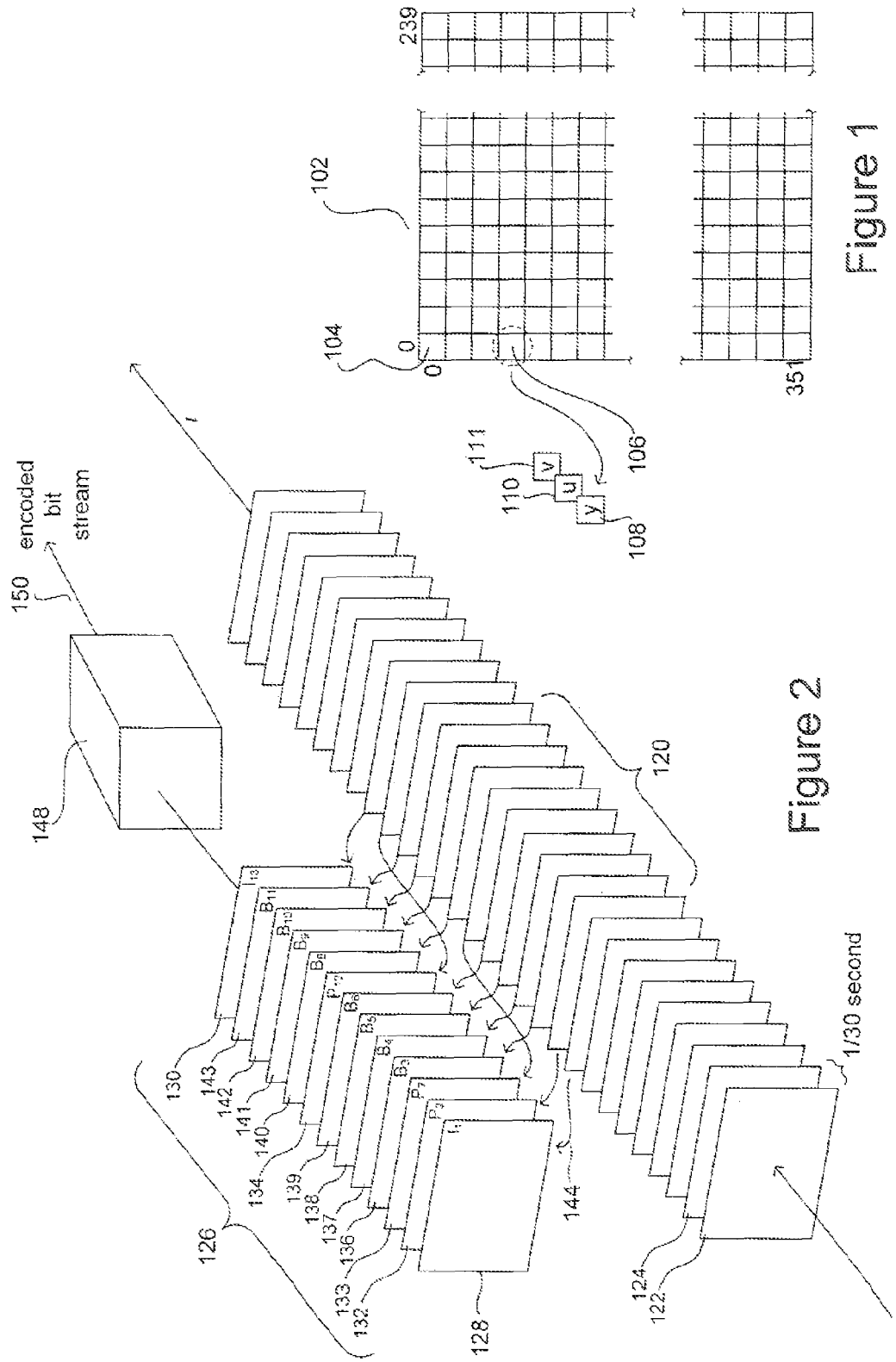

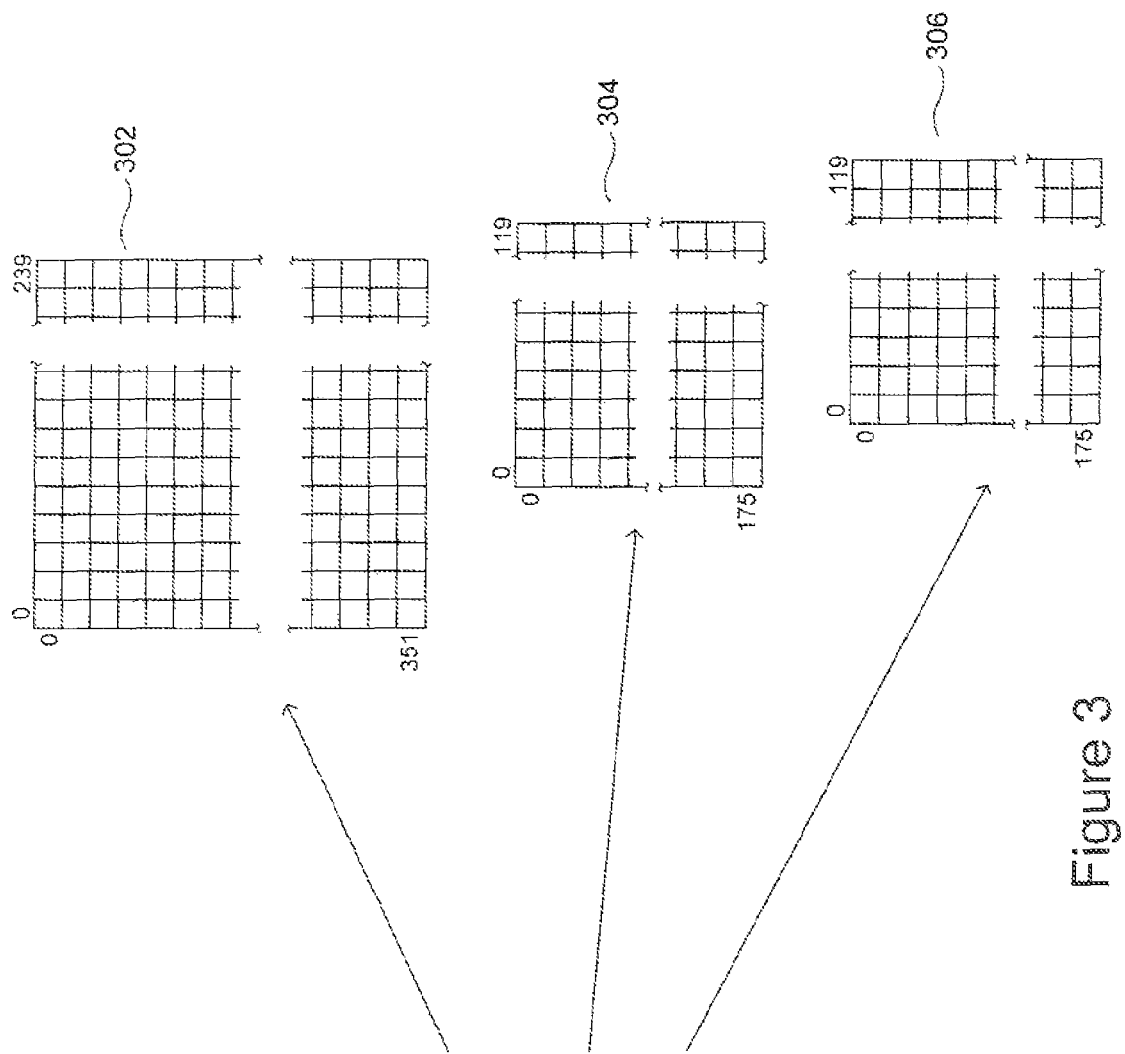
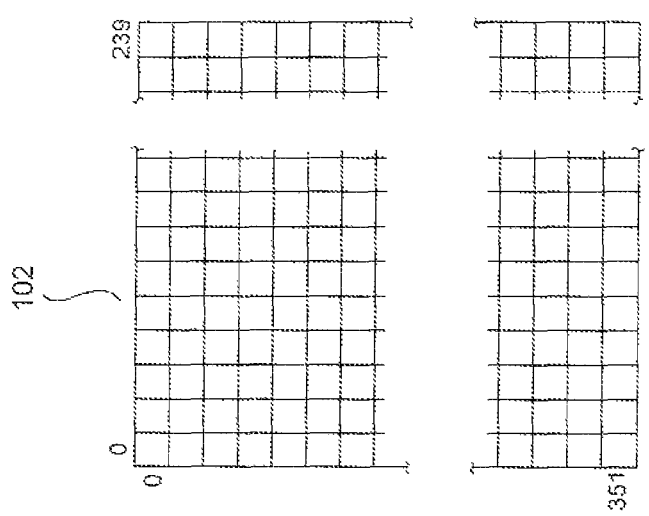
Figure 3

$$Q = \begin{matrix} [\ 8 & 16 & 19 & 22 & 26 & 27 & 29 & 34] \\ [16 & 16 & 22 & 24 & 27 & 29 & 34 & 37] \\ [19 & 22 & 26 & 27 & 29 & 34 & 34 & 38] \\ [22 & 22 & 26 & 27 & 29 & 34 & 37 & 40] \\ [22 & 26 & 27 & 29 & 32 & 35 & 40 & 48] \\ [26 & 27 & 29 & 32 & 35 & 40 & 48 & 58] \\ [26 & 27 & 29 & 34 & 38 & 46 & 56 & 69] \\ [27 & 29 & 35 & 38 & 46 & 56 & 69 & 83] \end{matrix} \quad \text{— 702}$$

$$QDCT = \frac{DCT_{(8,8)} * 8}{scale * Q} \quad \text{— 704}$$

Figure 7

METHOD AND SYSTEM FOR MIXED-RESOLUTION LOW-COMPLEXITY INFORMATION CODING AND A CORRESPONDING METHOD AND SYSTEM FOR DECODING CODED INFORMATION

TECHNICAL FIELD

The present invention is related to information coding and data transmission through electronic communications media.

BACKGROUND

A variety of video compression/decompression methods and compression/decompression hardware/firmware modules and software modules ("codecs"), including the Moving Picture Experts Group ("MPEG") MPEG-1, MPEG-2, and MPEG-4 video coding standards and the more recent H.264 video coding standard, have been developed to code pixel-based and frame-based video signals into compressed bit streams, by lossy compression techniques, for compact storage in electronic, magnetic, and optical storage media, including DVDs and computer files, as well as for efficient transmission via cable television, satellite television, and the Internet. The compressed bit stream can be subsequently accessed, or received, and decompressed by a decoder in order to generate a reasonably high-fidelity reconstruction of the original pixel-based and frame-based video signal.

Because many of the currently available video coding methods have been designed for broadcast and distribution of compressed bit streams to a variety of relatively inexpensive, low-powered consumer devices, the currently available video coding methods generally tend to partition the total computational complexity of the coding-compression/decoding-decompression process so that coding, generally carried out once or a very few times by video distributors and broadcasters, is computationally complex and expensive, while decoding, generally carried out on relatively inexpensive, low-powered consumer devices, is computationally straightforward and inexpensive. However, with the emergence of a variety of hand-held video-recording consumer devices, including video cameras, cell phones, and other such hand-held, portable devices, a need has arisen for video codecs that place a relatively small computational burden on the coding/compression functionality within the hand-held video recording device, and a comparatively high computational burden on the decoding device, generally a high-powered server or other computationally well-endowed coded-video-signal-receiving entity. This division of computational complexity is referred to as "reversed computational complexity."

A relatively extreme reversed-computational-complexity problem domain involves information collection and coding, by low-powered, computationally-constrained sensor devices interconnected by a wireless network, for transmission to high-end computer systems for decoding and subsequent processing. Designers, manufacturers, and users of computationally-constrained, low-power information sources, including the above-mentioned sensors, continue to seek improved information-coding and coded-information-decoding methods and systems that provide efficient coding and transmission of sensor-collected information through various electronic communications media to computer systems with relatively large computational bandwidths.

BRIEF DESCRIPTION OF THE DRAWINGS

FIG. 1 illustrate a pixel-based video-signal frame.
FIG. 2 illustrates coding of the video signal.
FIG. 3 illustrates a first, logical step in coding of a frame.
FIG. 7 illustrates an exemplary quantization of frequency-domain coefficients.

DETAILED DESCRIPTION

Figure 4:
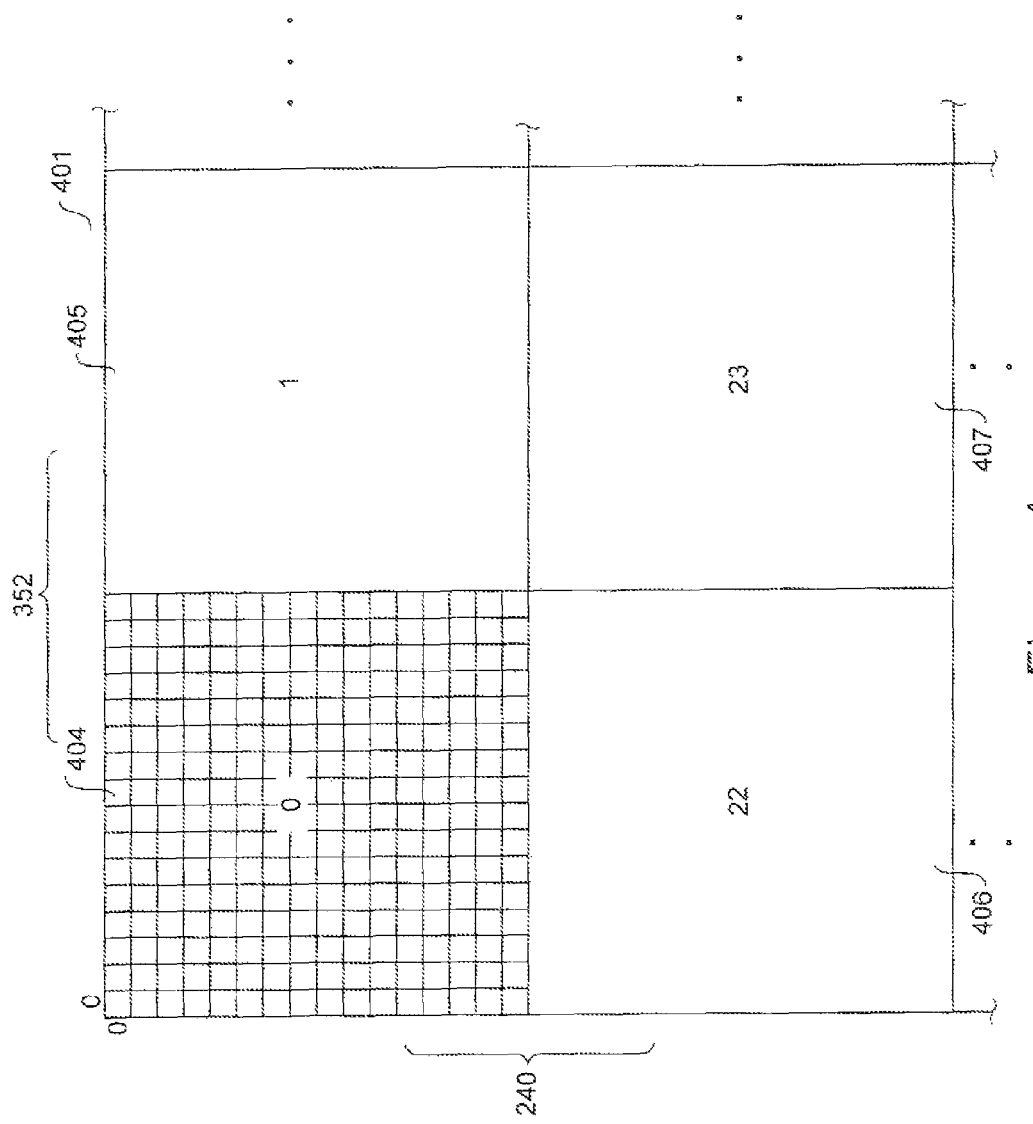
FIG. 4 illustrates composition of a video frame into macroblocks.

Embodiments of the present invention are directed to mixed-resolution, low-complexity information coding and decoding methods and systems that allow computationally constrained, relatively low-power devices to code information efficiently for transmission to computer systems with fewer computational constraints. The method and system embodiments of the present invention place greatest computational burden on the information sink, or computer system, and a smaller computational burden on the information sources, in accordance with their respective capabilities. One problem domain to which method and system embodiments of the present invention can be applied is a wireless network of synchronized camera sensors that monitor a particular environment by capturing continuous video images of the environment for transmission to a remote computer system. Each camera sensor in the wireless network of camera sensors generally images the environment from a unique perspective, but the perspectives of camera sensors within local neighborhoods may be similar and the images captured by the cameras within a local neighborhood may be highly correlated. For example, two camera sensors directed to a common area within a monitored environment may produce very similar video images of the same scene from somewhat different angles. A large portion of the information collected by the information sources within a monitored environment may be, in other words, redundant. This fact can be used to facilitate efficient coding of the information collected by the networked camera sensors, with the remote computer-system information sink relying on redundant information received from multiple information sources to reconstruct high-resolution images from coded images.

In a first subsection, below, an overview of video coding and decoding methods and subsystems is provided and, in a second subsection, the Slepian-Wolf and Wyner-Ziv theorems are discussed, in overview. Following the two overview subsections, a third subsection provides a detailed description of various embodiments of the present invention within the context of a multiple-camera-sensor wireless network, each camera sensor transmitting a continuous coded video signal to a remote computer system, where the coded signal is decoded to produce a video signal close to the original video signal captured by the camera sensor prior to coding. Coding of the video signal by the information sources compresses the video signal, allowing the video signal to be transmitted through a communications medium with greater efficiency.

Overview of Currently Available Video Codecs

FIG. 1 illustrates a pixel-based video-signal frame. The frame 102 can be considered to be a two-dimensional array of pixels. Each cell of the two-dimensional array, such as cell 104, represents a value for display by a corresponding pixel of an electronic display device, such as a television display or computer monitor. In one standard, a video-signal frame 102 represents display of an image containing 240×352 pixels. The digital representation of each pixel, such as pixel 106, includes a luminance value 108 and two chrominance values 110-111. The luminance value 108 can be thought of as controlling the grayscale darkness or brightness of the pixel, and the chrominance values 110 and 111 specify the color to be displayed by the pixel.

FIG. 2 illustrates coding of a frame-based video signal. A raw video signal can be considered to be a series, or sequence, of frames 120 ordered with respect to time. In one common standard, any two frames, such as frames 122 and 124 in FIG. 2, are separated by a time of 1/30 of a second. The video coding process divides the sequence of frames in the raw signal into a time-ordered sequence of subsequences, each subsequence referred to as a "GOP." Each GOP overlaps the previous and succeeding GOPS in the first and last frames. In FIG. 2, the 13 frames 126 comprise a single GOP. The number of frames in a GOP may vary, depending on the particular codec implementation, desired fidelity of reconstruction of the video signal, desired resolution, and other factors. A GOP generally begins and ends with intraframes, such as intraframes 128 and 130 in GOP 126. Intraframes, also referred to as "I frames," are reference frames that are spatially coded. A number of P frames 132-134 and B frames 136-139 and 140-143 occur within the GOP. P frames and B frames may be both spatially and temporally coded. Coding of a P frame relies on a previous I frame or P frame, and the coding of a B frame relies on both a previous and subsequent I frame or P frame. In general, I frames and P frames are considered to be reference frames. As shown in FIG. 2 by arrows, such as arrow 144, the raw frames selected for P frames and B frames occur in a different order within the GOP than the order in which they occur in the raw video signal. Each GOP is input, in time order, to a coding module 148 which codes the information contained within the GOP into a compressed bit stream 150 that can be output for storage on an electronic storage medium or for transmission via an electronic communications medium.

FIG. 3 illustrates a first, logical step in coding of a frame. As discussed with reference to FIG. 1, above, a video frame 102 can be considered to be a two-dimensional array of pixel values, each pixel value comprising a luminance value and two chrominance values. Thus, a single video frame can be alternatively considered to be composed of a luminance frame 302 and two chrominance frames 304 and 306. Because human visual perception is more acutely attuned to luminance than to chrominance, the two chrominance frames 304 and 306 are generally decimated by a factor of two in each dimension, or by an overall factor of four, to produce lower-resolution, 120×175 frames.

FIG. 4 illustrates composition of a video frame into macroblocks. As shown in FIG. 4, a video frame, such as the 240×352 video frame 401, only a small portion of which appears in FIG. 4, can be decomposed into a set of non-overlapping 16×16 macroblocks. This small portion of the frame shown in FIG. 4 has been divided into four macroblocks 404-407. When the macroblocks are numerically labeled by left-to-right order of appearance in successive rows of the video frame, the first macroblock 401 in FIG. 4 is labeled "0" and the second macroblock 405 is labeled "1." Twenty additional macroblocks, not shown in FIG. 4, follow macroblock 1 in the first row of the video frame, so the third macroblock 406 shown in FIG. 4, the first macroblock of the second row, is labeled "22," and the final macroblock 407 shown in FIG. 4 is labeled "23."

Figure 5:
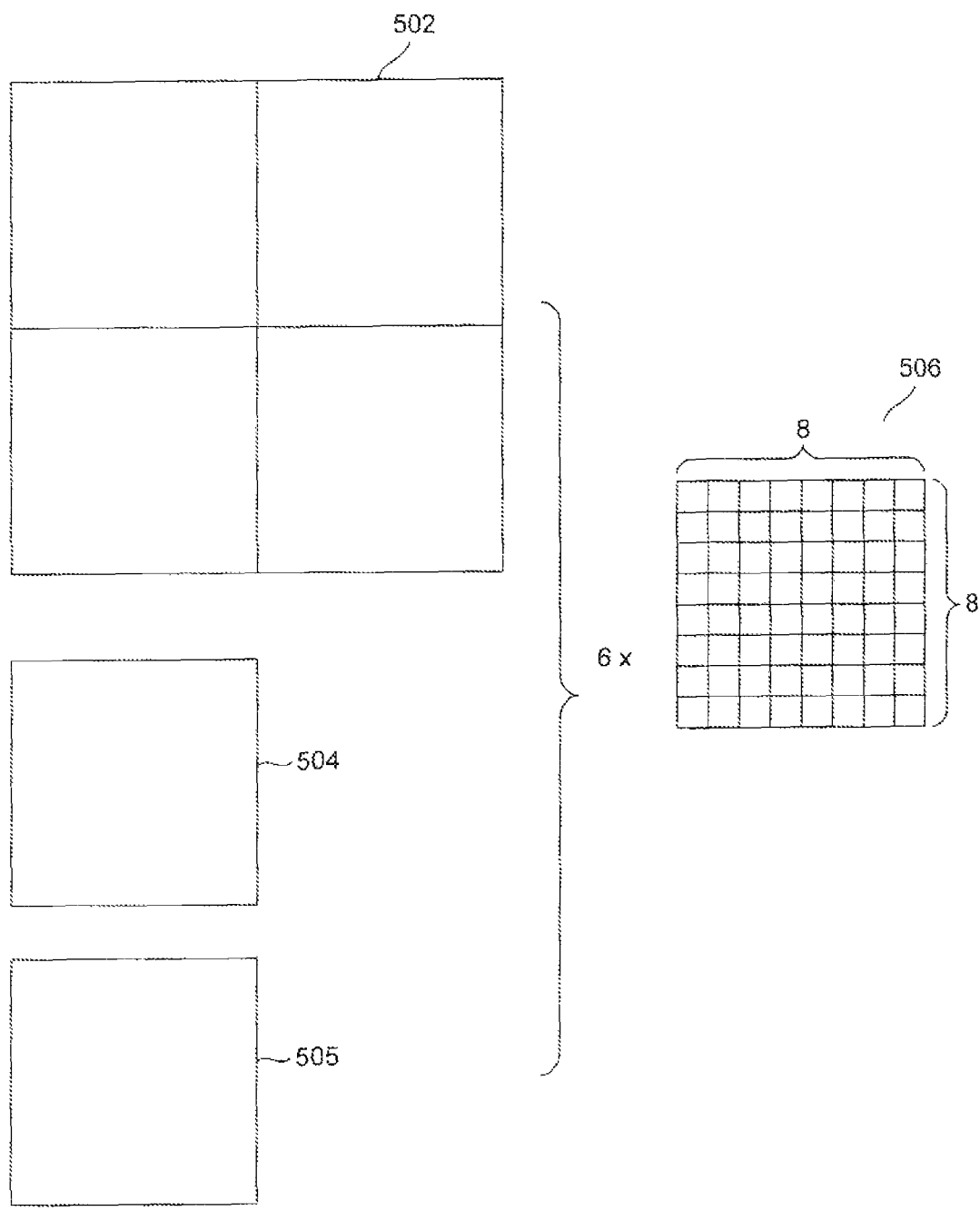
FIG. 5 illustrates decomposition of a macroblock into six 8×8 blocks.

FIG. 5 illustrates decomposition of a macroblock into six 8×8 blocks. As discussed above, a video frame, such as video frame 102 in FIG. 1, can be decomposed into a series of 16×16 macroblocks, such as macroblock 404 in FIG. 4. As discussed with reference to FIG. 3, each video frame, or macroblock within a video frame, can be considered to be composed of a luminance frame and two chrominance frames, or a luminance macroblock and two chrominance macroblocks, respectively. As discussed with reference to FIG. 3, chrominance frames and/or macroblocks are generally decimated by an overall factor of four. Thus, a given macroblock within a video frame, such as macroblock 404 in FIG. 4, can be considered to be composed of a luminance 16×16 macroblock 502 and two 8×8 chrominance blocks 504 and 505. The luminance macroblock 502 can be, as shown in FIG. 5, decomposed into four 8×8 blocks. Thus, as shown in FIG. 5, a given macroblock within a video frame, such as macroblock 404 in video frame 401 shown in FIG. 4, can be composed into six 8×8 blocks 506, including four luminance 8×8 blocks and two chrominance 8×8 blocks. Spatial coding of video frames is carried out on an 8×8 block basis. Temporal coding of video frames is carried out on a 16×16 macroblock basis.

Figure 6:
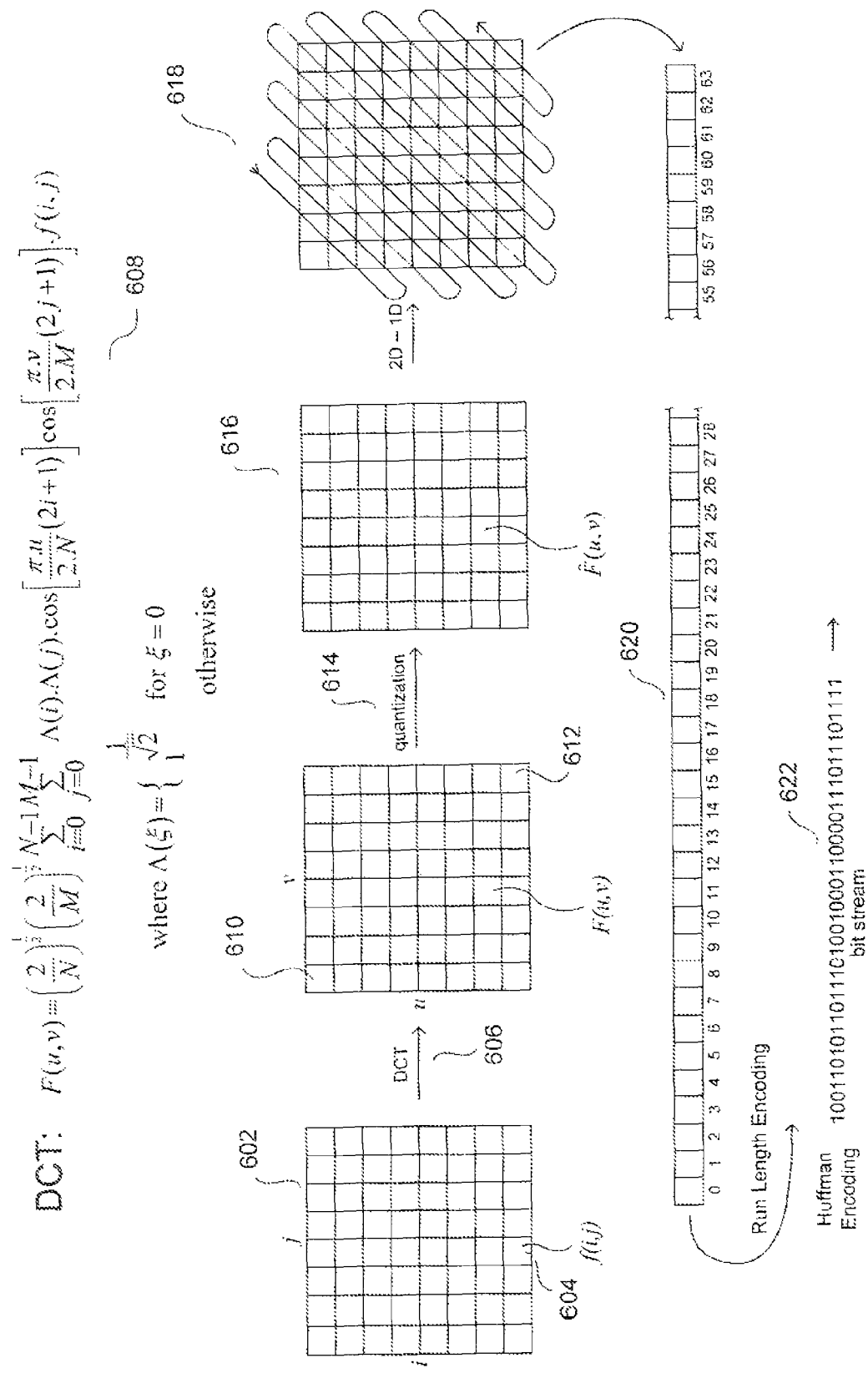
FIG. 6 illustrates spatial coding of an 8×8 block extracted from a video frame, as discussed above with reference to FIGS. 1-5.

FIG. 6 illustrates spatial coding of an 8×8 block extracted from a video frame, as discussed above with reference to FIGS. 1-5. Each cell or element of the 8×8 block 602, such as cell 604, contains a luminance or chrominance value f(i,j), where i and j are the row and column coordinates, respectively, of the cell. The cell is transformed 606, in many cases using a discrete cosign transform ("DCT"), from the spatial domain represented by the array of intensity values f(i,j) to the frequency domain, represented by a two-dimensional 8×8 array of frequency-domain coefficients F(u,v). An expression for an exemplary DCT is shown at the top of FIG. 6 608. The coefficients in the frequency domain indicate spatial periodicities in the vertical, horizontal, and both vertical and horizontal directions within the spatial domain. The $F_{(0,0)}$ coefficient 610 is referred to as the "DC" coefficient, and has a value proportional to the average intensity within the 8×8 spatial-domain block 602. The periodicities represented by the frequency-domain coefficients increase in frequency from the lowest-frequency coefficient 610 to the highest-frequency coefficient 612 along the diagonal interconnecting the DC coefficient 610 with the highest-frequency coefficient 612.

Next, the frequency-domain coefficients are quantized 614 to produce an 8×8 block of quantized frequency-domain coefficients 616. FIG. 7 illustrates an exemplary quantization of frequency-domain coefficients. Quantization employs an 8×8 quantization matrix Q 702. In one exemplary quantization process, represented by expression 704 in FIG. 7, each frequency-domain coefficient is multiplied by 8, and it is then divided, using integer division, by the corresponding value in quantization-matrix Q that may be first scaled by a scale factor. Quantized coefficients have small-integer values. Examination of the quantization-matrix Q reveals that, in general, higher frequency coefficients are divided by larger values than lower frequency coefficients in the quantization process. Since Q-matrix integers are larger for higher-frequency coefficients, the higher-frequency coefficients end up quantized into a smaller range of integers, or quantization bins. In other words, the range of quantized values for lower-frequency coefficients is larger than for higher-frequency coefficients. Because lower-frequency coefficients generally have larger magnitudes, and generally contribute more to a perceived image than higher-frequency coefficients, the result of quantization is that many of the higher-frequency quantized coefficients, in the lower right-hand triangular portion of the quantized-coefficient block 616, are forced to zero. Next, the block of quantized coefficients 618 is traversed, in zig-zag fashion, to create a one-dimensional vector of quantized coefficients 620. The one-dimensional vector of quantized coefficients is then coded using various entropy-coding techniques, generally run-length coding followed by Huffman coding, to produce a compressed bit stream 622. Entropy-coding techniques take advantage of a non-uniform distribution of the frequency of occurrence of symbols within a symbol stream to compress the symbol stream. A final portion of the one-dimensional quantized-coefficient vector 620 with highest indices often contains only zero values. Run-length coding can represent a long, consecutive sequence of zero values by a single occurrence of the value "0" and the length of the subsequence of zero values. Huffman coding uses varying-bit-length codings of symbols, with shorter-length codings representing more frequently occurring symbols, in order to compress a symbol string.

Spatial coding employs only information contained within a particular 8×8 spatial-domain block to code the spatial-domain block. As discussed above, I frames are coded by using only spatial coding. In other words, each I frame is decomposed into 8×8 blocks, and each block is spatially coded, as discussed above with reference to FIG. 6. Because the coding of I frames is not dependant on any other frames within a video signal, I frames serve as self-contained reference points that anchor the decoding process at regularly spaced intervals, preventing drift in the decoded signal arising from interdependencies between coded frames.

Because a sequence of video frames, or video signal, often codes a dynamic image of people or objects moving with respect to a relatively fixed background, or a video camera panned across a background, a sequence of video frames often contains a large amount of redundant information, some or much of which is translated or displaced from an initial position, in an initial frame, to a series of subsequent positions across subsequent frames. For this reason, detection of motion of images or sub-images within a series of video frames provides a means for relatively high levels of compression. Techniques to detect motion of images and sub-images within a sequence of video frames over time and use the redundant information contained within these moving images and sub-images is referred to as temporal compression.

Figure 8:
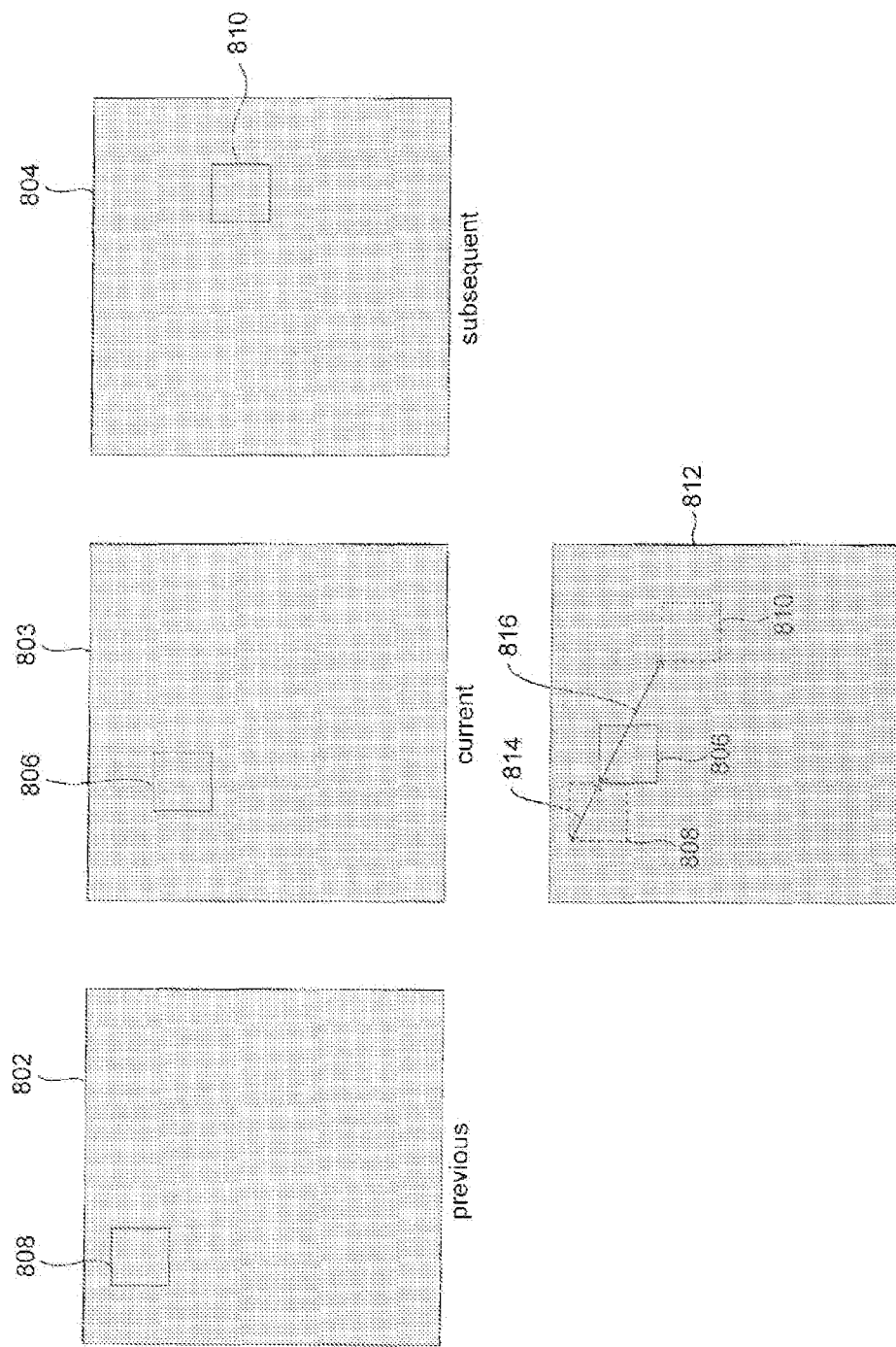
FIG. 8 illustrates sub-image movement across a sequence of frames and motion vectors that describe sub-image movement.

FIG. 8 illustrates sub-image movement across a sequence of frames and motion vectors that describe sub-image movement. In FIG. 8, three video frames 802-804 selected from a GOP are shown. Frame 803 is considered to be the current frame, or frame to be coded and compressed. Frame 802 occurred in the original video-signal sequence of frames earlier in time than the current frame 803, and frame 804 follows frame 803 in the original video signal. A particular 16×16 macroblock 806 in the current frame 803 is found in a first, and different, position 808 in the previous frame 802 and in a second and different position 810 in the subsequent frame 804. Superimposing the positions of the macroblock 806 in the previous, current, and subsequent frames within a single frame 812, it is observed that the macroblock appears to have moved diagonally downward from the first position 808 to the second position 810 through the current position 806 in the sequence of frames in the original video signal. The position of the current frame 806 and two displacement, or motion, vectors 814 and 816 describe the temporal and spatial motion of the macroblock 806 in the time period represented by the previous, current, and subsequent frames. The basic concept of temporal compression is that macroblock 806 in the current frame can be coded as either one or both of the motion vectors 814 and 816, since the macroblock will have been coded in codings of the previous and subsequent frames, and therefore represents redundant information in the current frame, apart from the motion-vector-based information concerning its position within the current frame.

Figure 9:
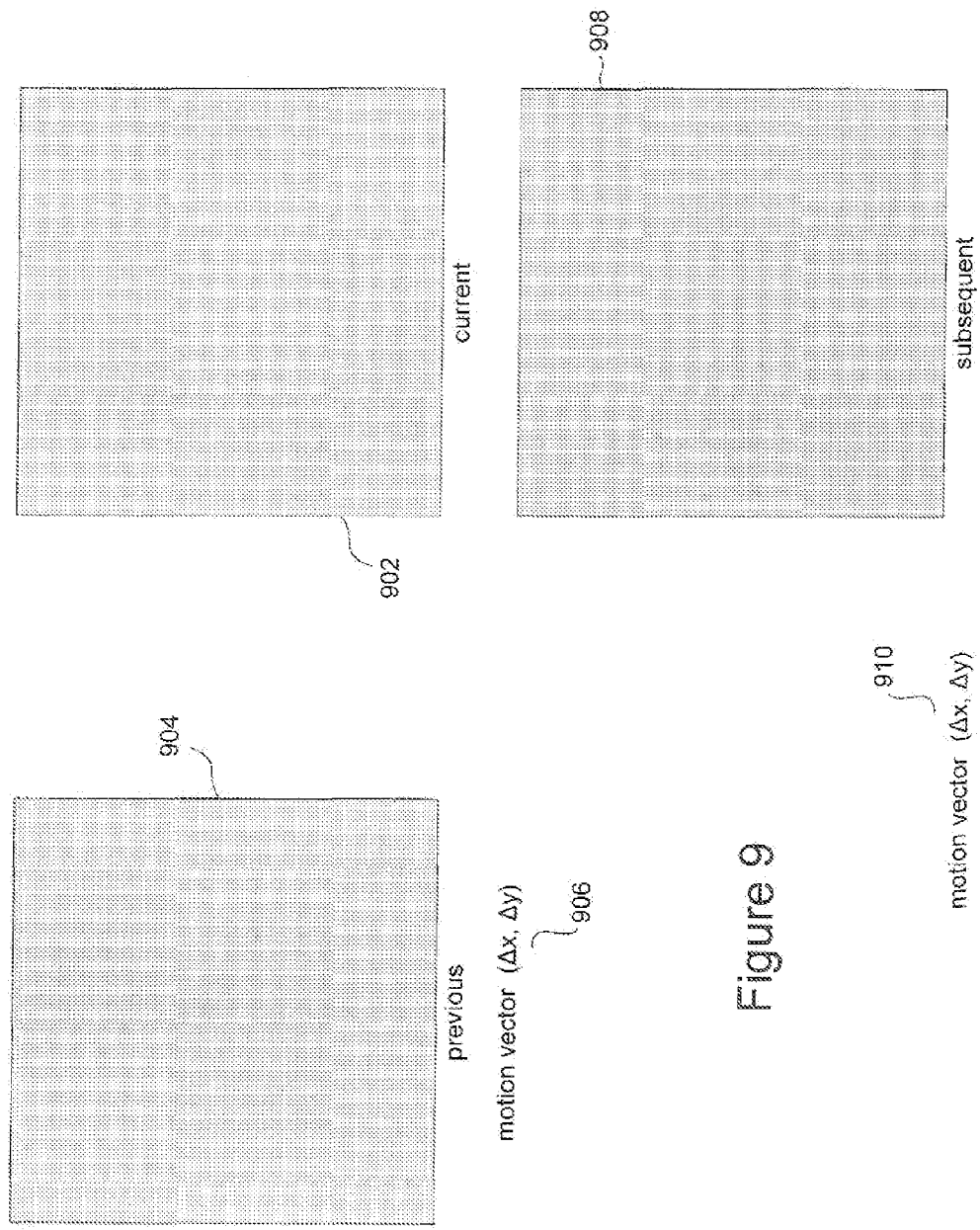
FIG. 9 shows the information used for temporal coding of a current frame.

FIG. 9 shows the information used for temporal coding of a current frame. Temporal coding of a current frame uses the current frame 902 and either a single previous frame 904 and single motion vector 906 associated with the previous frame or both the previous frame and associated motion vector 904 and 906 and a subsequent frame 908 and associated motion vector 910. P-frame temporal coding may use only a previous frame and a previous I frame or P frame, and B-frame coding may use both a previous and subsequent I frame and/or P frame.

Figure 10:
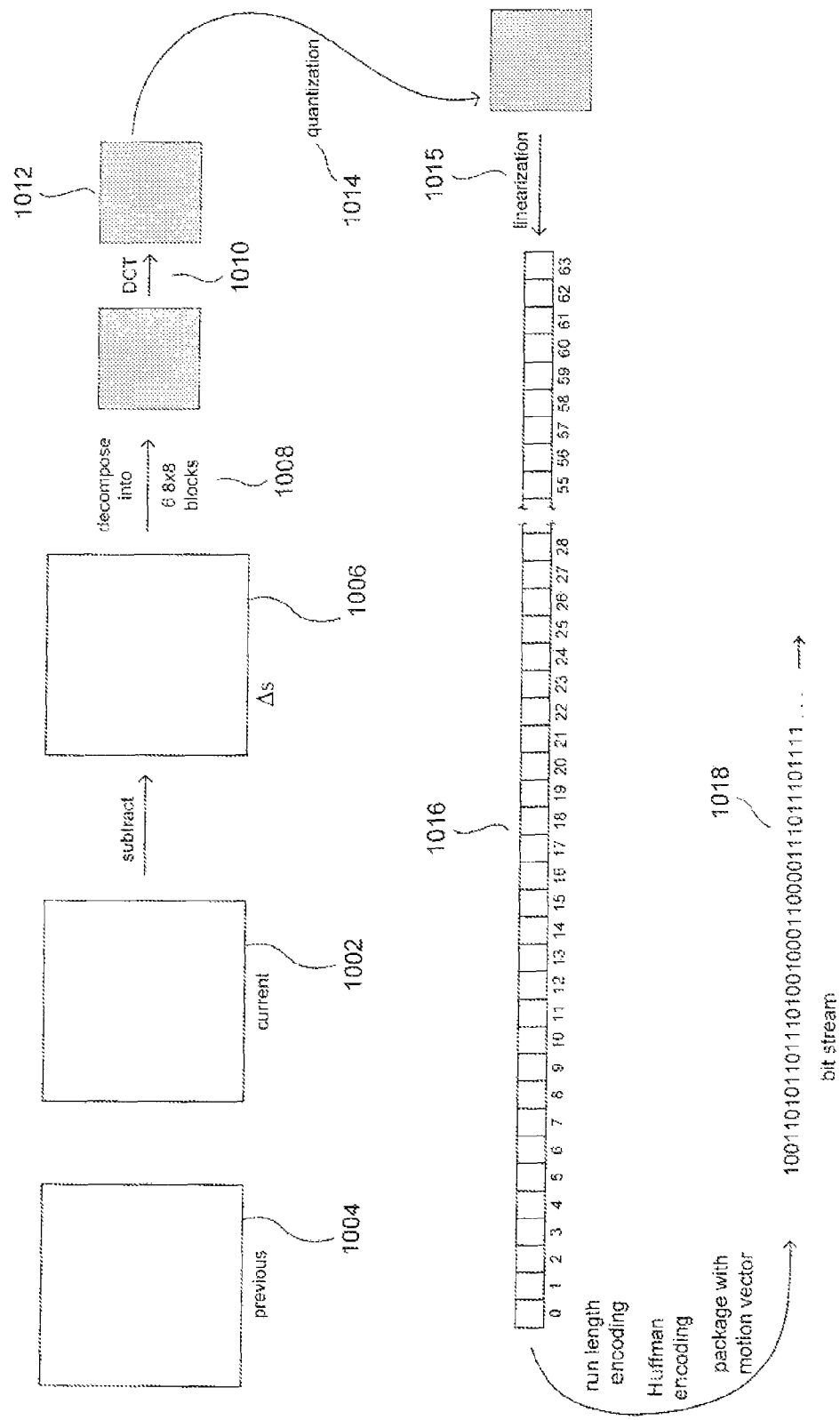
FIG. 10 illustrates P-frame temporal coding.

FIG. 10 illustrates P-frame temporal coding. In P-frame temporal coding, a 16×16 current-frame macroblock 1002 and a 16×16 matching macroblock 1004 found in the previous frame are used for coding the 16×16 current-frame macroblock 1002. The previous-frame macroblock 1004 is identified as being sufficiently similar to the current-frame macroblock 1002 to be compressible by temporal compression, and the macroblock most similar to the current-frame macroblock.

Various techniques can be employed to identify a best-matching macroblock in a previous frame for a given macroblock within the current frame. A best-matching macroblock in the previous frame may be deemed sufficiently similar if the sum of absolute differences ("SAD") or sum of squared differences ("SSD") between corresponding values in the current-frame macroblock and best-matching previous-frame macroblock are below some threshold value. Associated with the current-frame macroblock 1002 and best-matching previous-frame macroblock 1004 is a motion vector (906 in FIG. 9). The motion vector may be computed as the horizontal and vertical offsets Δx and Δy of the upper, left-hand cells of the current-frame and best-matching previous-frame macroblocks. The current-frame macroblock 1002 is subtracted from the best-matching previous-frame macroblock 1004 to produce a residual macroblock 1006. The residual macroblock is then decomposed into six 8×8 blocks 1008, as discussed above with reference to FIG. 5, and each of the 8×8 blocks is transformed by a DCT 1010 to produce an 8×8 block of frequency-domain coefficients 1012. The block of frequency-domain coefficients is quantized 1014 and linearized 1015 to produce the one-dimensional vector of quantized coefficients 1016. The one-dimensional vector of quantized coefficients 1016 is then run-length coded and Huffman coded, and packaged together with the motion vector associated with the current-frame macroblock 1002 and best-matching previous-frame macroblock 1004 to produce the compressed bit stream 1018. The temporal compression of a P block is carried out on a macroblock-by-macroblock basis. If no similar macroblock for a particular current-frame macroblock can be found in the previous frame, then the current-frame macroblock can be spatially coded, as discussed above with reference to FIG. 6. Either a previous I frame or a previous P frame can be used for the previous frame during temporal coding of a current frame.

Figure 11:
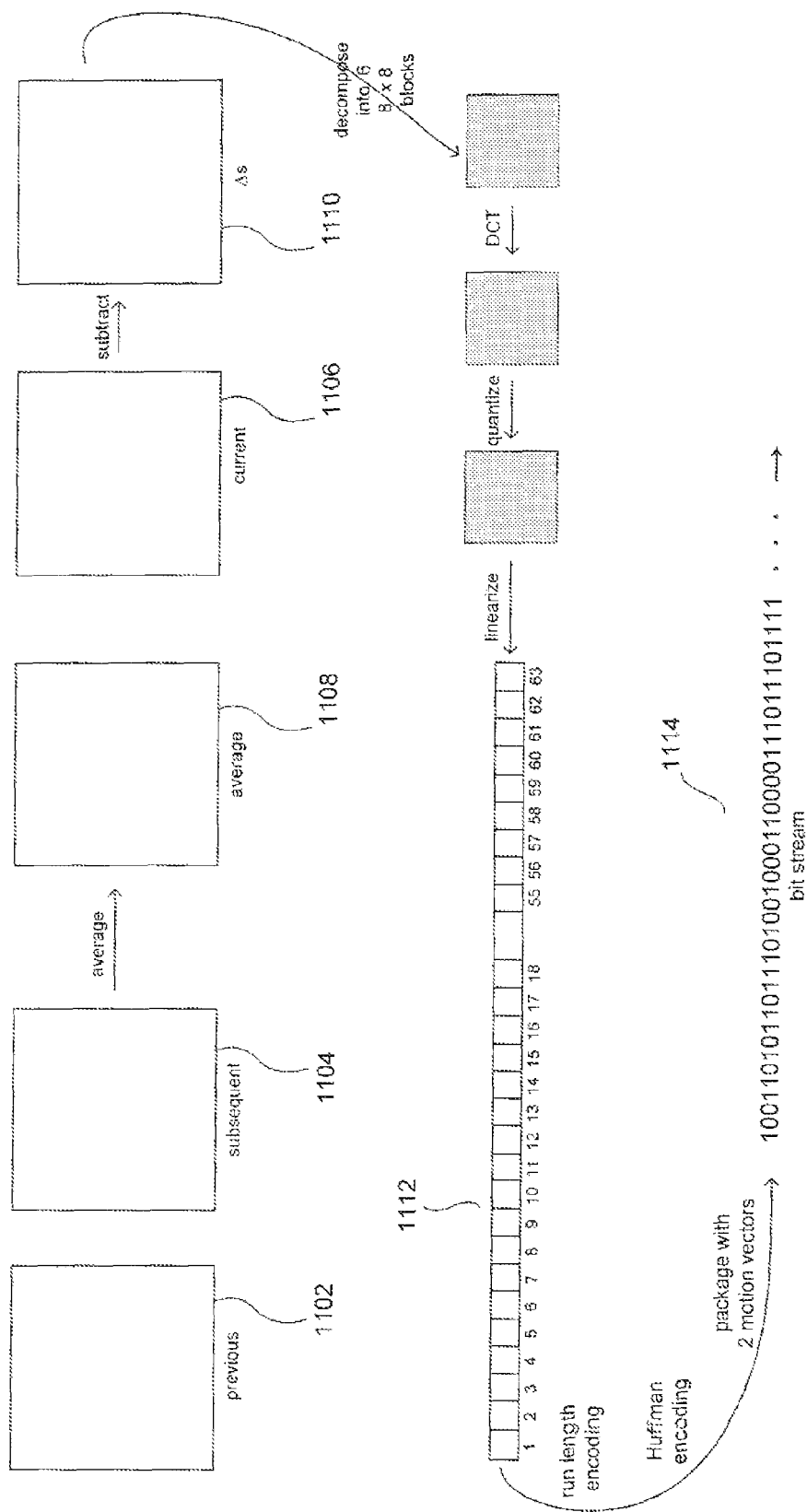
FIG. 11 illustrates B-frame temporal coding.

FIG. 11 illustrates B-frame temporal coding. Many of the steps in B-frame temporal coding are identical to those in P-frame coding. In B-frame coding, a best-matching macroblock from a previous frame 1102 and a best-matching macroblock from a subsequent frame 1104 corresponding to a current-frame macroblock 1106 are averaged together to produce an average matching frame 1108. The current-frame macroblock 1106 is subtracted from the average matching macroblock 1108 to produce a residual macroblock 1110. The residual macroblock is then spatially coded in exactly the same manner as the residual macroblock 1006 in P-frame coding is spatially coded, as described in FIG. 10. The one-dimensional quantized-coefficient vector 1112 resulting from spatial coding of the residual macroblock is entropy coded and packaged with the two motion vectors associated with the best-matching previous-frame macroblock 1102 and the best-matching subsequent-frame macroblock 1104 to produce a compressed bit stream 1114. Each macroblock within a B frame may be temporally compressed using only a best-matching previous-frame macroblock and associated motion vector, as in FIG. 10, only a best-matching subsequent-frame macroblock and associated motion vector, or with both a best-matching previous-frame macroblock and associated motion vector and a best-matching subsequent-frame macroblock and associated motion vector, as shown in FIG. 11. In addition, if no matching macroblock can be found in either the previous or subsequent frame for a particular current-frame macroblock, then the current-frame macroblock may be spatially coded, as discussed with reference to FIG. 6. Previous and subsequent frames may be either P or I frames.

Figure 12:
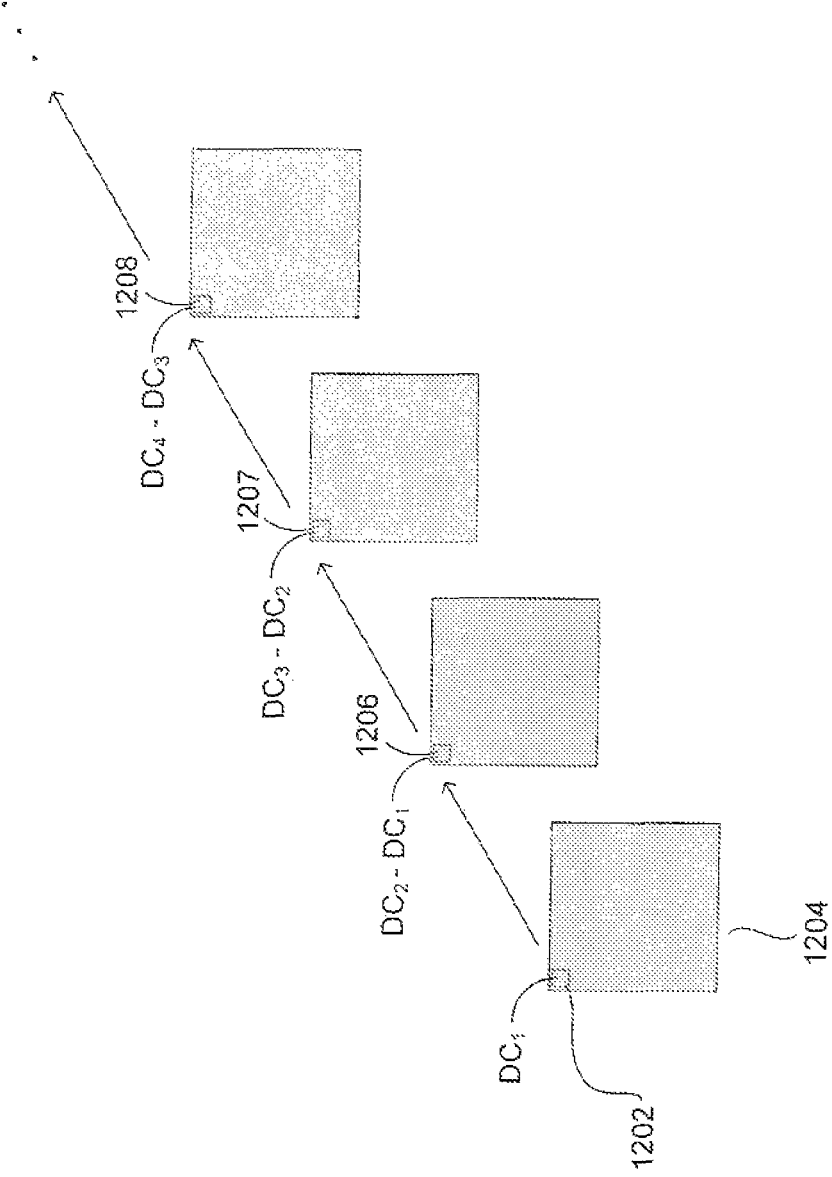
FIG. 12 illustrates DC coding.

FIG. 12 illustrates DC coding. As discussed above, the $F_{(0,0)}$ coefficient of the frequency domain represents the average intensity within the spatial domain. The DC coefficient is the single most important piece of information with respect to high-fidelity frame reconstruction. Therefore, the DC coefficients are generally represented at highest-possible resolution, and are coded by DCPM coding. In DCPM coding, the DC coefficient 1202 of the first I frame 1204 is coded into the bit stream, and, for each DC coefficient of subsequent frames 1206-1208, the difference between the subsequent-frame DC coefficient and the first reference frames DC coefficient 1202 is coded in the bit stream.

Figure 13:
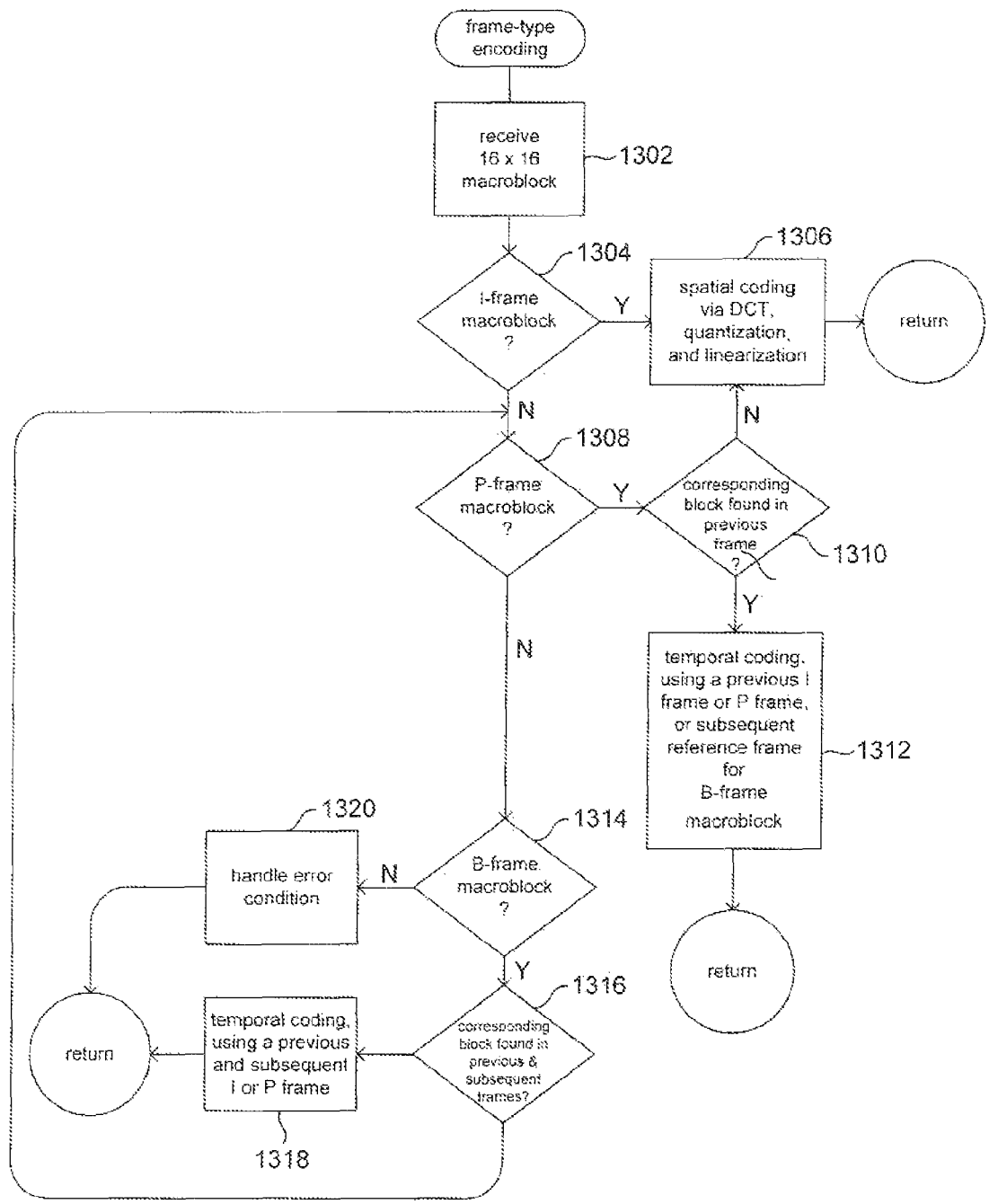
FIG. 13 summarizes I-frame, P-frame, and B-frame coding.

FIG. 13 summarizes I-frame, P-frame, and B-frame coding. In step 1302, a next 16×16 macroblock is received for coding. If the macroblock was extracted from an I frame, as determined in step 1304, then the macroblock is decomposed, in step 1306, into six 8×8 blocks that are spatially coded via DCT, quantization, linearization, and entropy coding, as described above with reference to FIG. 6, completing coding of the macroblock. Otherwise, if the received macroblock is extracted from a P frame, as determined in step 1308, then, if a corresponding macroblock can be found in a previous reference frame, as determined in step 1310, the macroblock is temporally coded as described with reference to FIG. 10 in step 1312. If, by contrast, a similar macroblock is not found in the previous reference frame, then the received macroblock is spatially coded in step 1306. If the received macroblock is extracted from a B frame, as determined in step 1314, then if a similar, matching macroblock is found in both the previous and subsequent reference frames, as determined in step 1316, the received macroblock is temporally coded, in step 1318, using both previous and subsequent reference frames, as discussed above with reference to FIG. 11. Otherwise, the macroblock is coded like a P-frame macroblock, with the exception that a single-best-matching-block temporal coding may be carried out with a best matching block in either the previous or subsequent reference frame. If the received 16×16 macroblock is not one of an I-frame, P-frame, or B-frame macroblock, then either an error condition has arisen or there are additional types of blocks within a GOP in the current coding method, and either of these cases is handled in step 1320.

Decoding of the compressed bit stream (150 in FIG. 2) generated by the video coding method discussed above with reference to FIGS. 1-13, is carried out by reversing the coding steps. Entropy decoding of the bit stream returns one-dimensional quantized-coefficient vectors for spatially-coded blocks and for residual blocks generated during temporal compression. Entropy decoding also returns motion vectors and other header information that is packaged in the compressed bit stream to describe the coded information and to facilitate decoding. The one-dimensional quantized-coefficient arrays can be used to generate corresponding two-dimensional quantized coefficient blocks and residual blocks and the quantized-coefficient blocks can be then converted into reconstructed frequency-domain coefficient blocks. Reconstruction of the frequency-domain coefficient blocks generally introduces noise, since information was lost in the quantization step of the coding process. The reconstructed frequency-domain-coefficient blocks can then be transformed, using an inverse DCT, to the spatial domain, and reassembled into reconstructed video frames. The above-described codec is therefore based on lossy compression, since the reconstructed video frame contains noise resulting from loss of information in the quantization step of the coding process.

Figure 14:
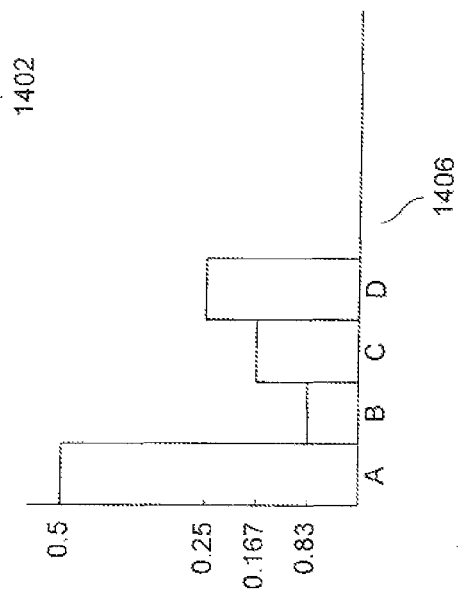
FIG. 14 illustrates calculation of the entropy associated with a symbol string and entropy-based coding of the symbol string.

Brief Introduction to Certain Concepts in
Information Science and Coding Theory and the
Slepian-Wolf and Wyner-Ziv Theorems FIG. 14 illustrates calculation of the entropy associated with a symbol string and entropy-based coding of the symbol string. In FIG. 14, a 24-symbol string 1402 is shown. The symbols in the 24-symbol string are selected from the set of symbols X that include the symbols A, B, C, and D 1404. The probability of occurrence of each of the four different symbols at a given location within the symbol string 1402, considering the symbol string to be the product of sampling of the random variable that can have, at a given point in time, one of the four values A, B, C, and D, can be inferred from the frequencies of occurrence of the four symbols in the symbol string 1402, as shown in equations 1404. A histogram 1406 of the frequency of occurrence of the four symbols is also shown in FIG. 14. The entropy of the symbol string, or of the random variable X used to generate the symbol string, is computed as:

$$H[X] \equiv -\sum_{x \in X} Pr(x)\log_2(Pr(x))$$

The entropy H is always positive, and, in calculating entropies, $\log_2(0)$ is defined as 0. The entropy of the 24-character symbol string can be calculated from the probabilities of occurrence of symbols 1404 to be 1.73. The smaller the entropy, the greater the predictability of the outcome of sampling the random variable X. For example, if the probabilities of obtaining each of the four symbols A, B, C, and D in sampling the random variable X are equal, and each is therefore equal to 0.25, then the entropy for the random variable X, or for a symbol string generated by repeatedly sampling the random variable X, is 2.0. Conversely, if the random variable were to always produce the value A, and the symbol string contained only the symbol A, then the probability of obtaining A from sampling the random variable would equal 1.0, and the probability of obtaining any of the other values B, C, D would be 0.0. The entropy of the random variable, or of an all-A-containing symbol string, is calculated by the above-discussed expression for entropy to be 0. An entropy of zero indicates no uncertainty.

Intermediate values of the entropy between 0 and 2.0, for the above considered 4-symbol random variable of symbol string, correspond to a range of increasing uncertainty. For example, in the symbol-occurrence distribution illustrated in the histogram 1406 and the probability equations 1404, one can infer that it is as likely that a sampling of the random variable X returns symbol A as any of the other three symbols B, C, and D. Because of the non-uniform distribution of symbol-occurrence frequencies within the symbol string, there is a greater likelihood of any particular symbol in the symbol string to have the value A than any one of the remaining three values B, C, D. Similarly, there is a greater likelihood of any particular symbol within the symbol string to have the value D than either of the two values B and C. This intermediate certainty, or knowledge gleaned from the non-uniform distribution of symbol occurrences, is reflected in the intermediate value of the entropy H[X] for the symbol string 1402. The entropy of a random variable or symbol string is associated with a variety of different phenomena. For example, as shown in the formula 1410 in FIG. 14, the average length of the binary code needed to code samplings of the random variable X, or to code symbols of the symbol string 1402, is greater than or equal to the entropy for the random variable or symbol string and less than or equal to the entropy for the random variable or symbol string plus one. For example, Huffman coding of the four symbols 1414 produces a coded version of the symbol string with an average number of bits per symbol, or rate, equal to 1.75 1416, which falls within the range specified by expression 1410.

One can calculate the probability of generating any particular n-symbol symbol string with the symbol-occurrence frequencies of the symbol string shown in FIG. 14 as follows:

$$\begin{aligned}Pr(S_n) &= Pr(A)^{nPr(A)}Pr(A)^{nPr(B)}Pr(A)^{nPr(C)}Pr(A)^{nPr(D)}\\ &= [2^{\log_2 Pr(A)}]^{nPr(A)}[2^{\log_2 Pr(B)}]^{nPr(B)}\\ &\quad [2^{\log_2 Pr(C)}]^{nPr(C)}[2^{\log_2 Pr(D)}]^{nPr(D)}\\ &= 2^{n[Pr(A)\log_2 Pr(A)+Pr(B)\log_2 Pr(B)+Pr(C)\log_2 Pr(C)+Pr(D)\log_2 Pr(D)]}\\ &= 2^{-nH[X]}\end{aligned}$$

Thus, the number of typical symbol strings, or symbol strings having the symbol-occurrence frequencies shown in FIG. 14, where n=24, can be computed as:

$$\frac{1}{2^{-24(1.73)}} = \frac{1}{3.171 \times 10^{-13}} = 3.153 \times 10^{12}$$

If one were to assign a unique binary integer value to each of these typical strings, the minimum number of bits needed to express the largest of these numeric values can be computed as:

$$\log_2(3.153 \times 10^{12}) = 41.521$$

The average number of bits needed to code each character of each of these typical symbol strings would therefore be:

$$\frac{41.521}{24} = 1.73 = H[X]$$

Figure 15:
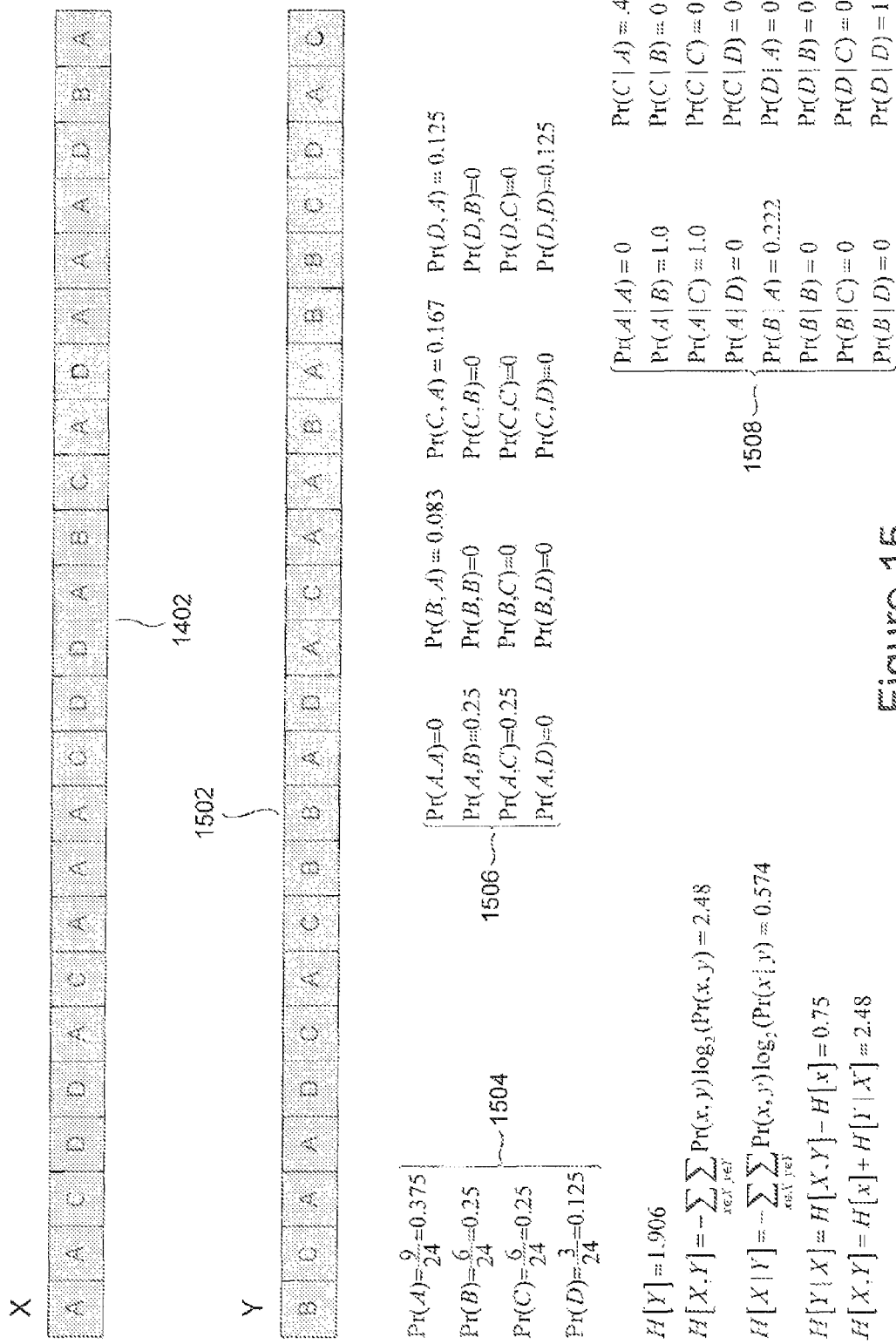
FIG. 15 illustrates joint and conditional entropies for two different symbol strings generated from two different random variables X and Y.

FIG. 15 illustrates joint and conditional entropies for two different symbol strings generated from two different random variables X and Y. In FIG. 15, symbol string 1402 from FIG. 14 is shown paired with symbol string 1502, also of length 24, generated by sampling a random variable Y that returns one of symbols A, B, C, and D. The probabilities of the occurrence of symbols A, B, C, and D in a given location within symbol string Y are computed in equations 1504 in FIG. 15. Joint probabilities for the occurrence of symbols at the same position within symbol string X and symbol string Y are computed in the set of equations 1506 in FIG. 15, and conditional probabilities for the occurrence of symbols at a particular position within symbol string X given that the fact that a particular symbol occurs at the corresponding position in symbol string Y are known in equations 1508. The entropy for symbol string Y, H[Y], can be computed from the frequencies of symbol occurrence in string Y 1504 as 1.906. The joint entropy for symbol strings X and Y, H[X,Y], is defined as:

$$H[X, Y] = -\sum_{x \in X}\sum_{y \in X} Pr(x, y)\log_2(Pr(x, y))$$

and, using the joint probability values 1506 in FIG. 15, can be computed to have the value 2.48 for the strings X and Y. The conditional entropy of symbol string X, given symbol string Y, H[X|Y] is defined as:

$$H[X \mid Y] = -\sum_{x \in X} \sum_{y \in X} Pr(x, y) \log_2(Pr(x \mid y))$$

and can be computed using the joint probabilities 1506 in FIG. 15 and conditional probabilities 1508 in FIG. 15 to have the value 0.574. The conditional probability H[Y|X] can be computed from the joint entropy and previously computed entropy of symbol string X as follows:

$$H[Y|X]=H[X,Y]-H[X]$$

and, using the previously calculated values for H[X, Y] and H[X], can be computed to be 0.75.

Figure 16:
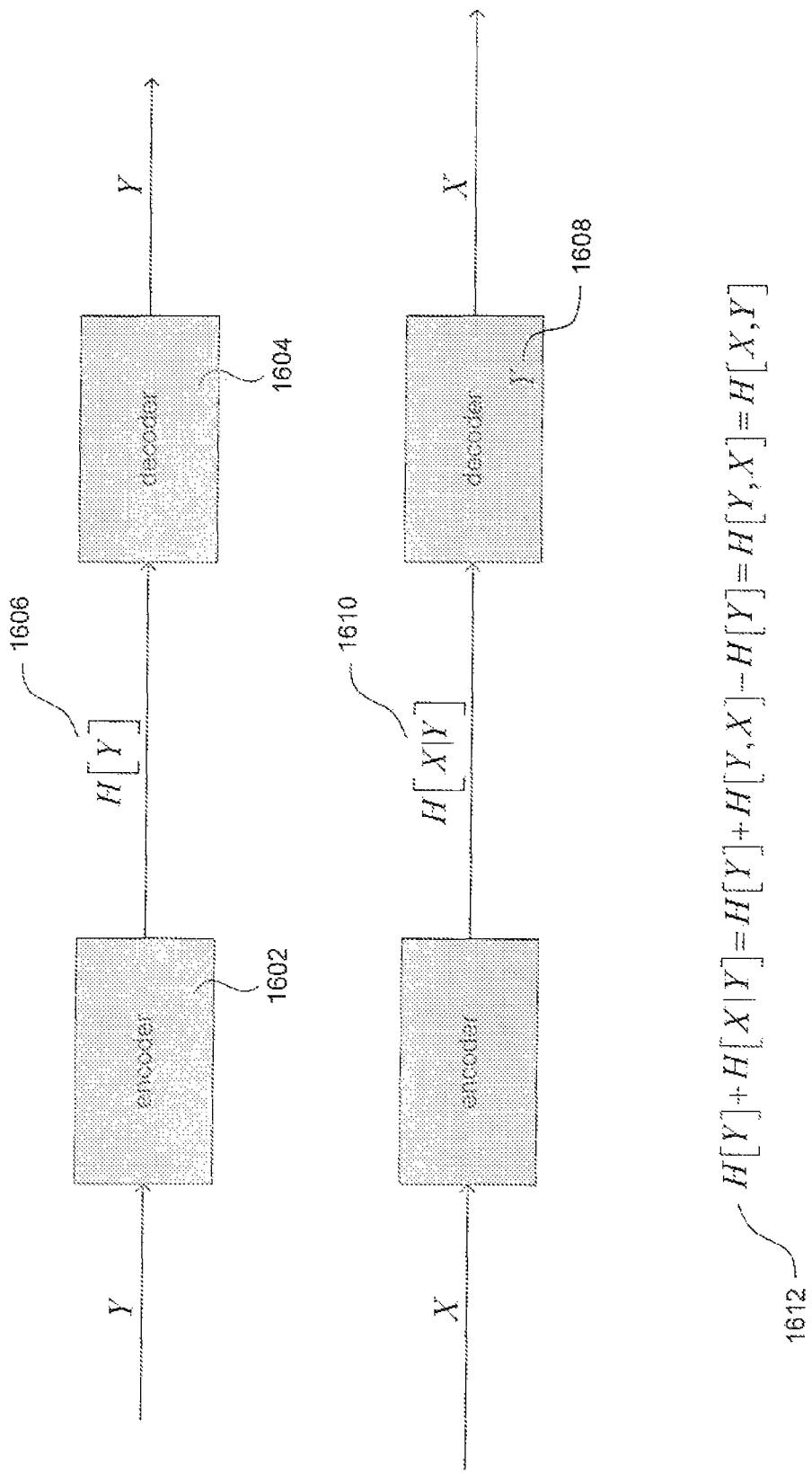
FIG. 16 illustrates lower-bound transmission rates, in bits per symbol, for coding and transmitting symbol string Y followed by symbol string X.

FIG. 16 illustrates lower-bound transmission rates, in bits per symbol, for coding and transmitting symbol string Y followed by symbol string X. Symbol string Y can be theoretically coded by a coder 1602 and transmitted to a decoder 1604 for perfect, lossless reconstruction at a bit/symbol rate of H[Y] 1606. If the decoder keeps a copy of symbol string Y 1608, then symbol string X can theoretically be coded and transmitted to the decoder with a rate 1610 equal to H[X|Y]. The total rate for coding and transmission of first symbol string Y and then symbol string X is then:

$$H[Y]+H[X|Y]=H[Y]+H[Y,X]-H[Y]=H[Y,X]=H[X,Y]$$

Figure 17:
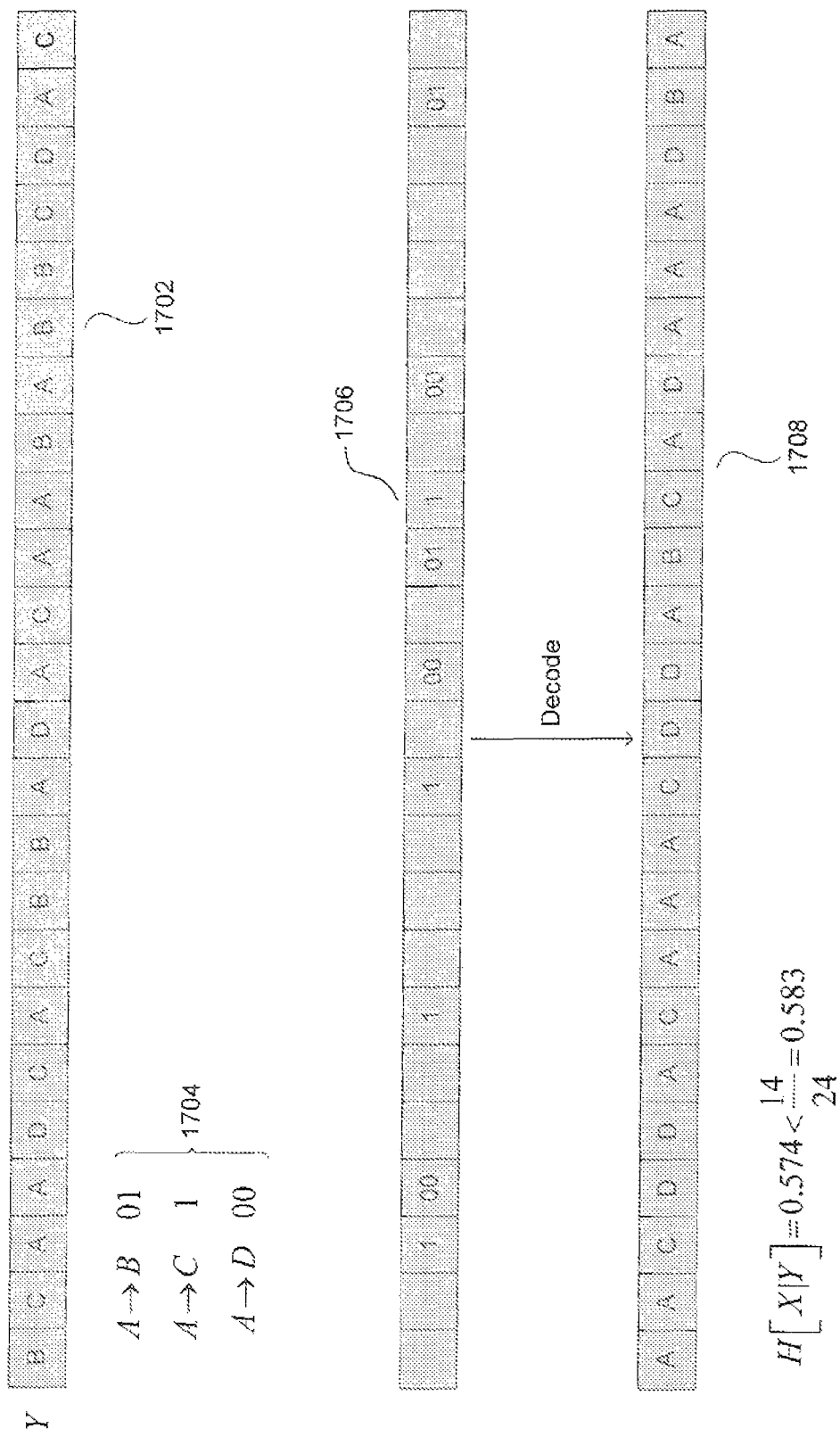
FIG. 17 illustrates one possible coding method for coding and transmitting symbol string X, once symbol string Y has been transmitted to the decoder.

FIG. 17 illustrates one possible coding method for coding and transmitting symbol string X, once symbol string Y has been transmitted to the decoder. As can be gleaned by inspection of the conditional probabilities 1508 in FIG. 15, or by comparing the aligned symbol strings X and Y in FIG. 15, symbols B, C, and D in symbol string Y can be translated, with certainty, to symbols A, A, and D in corresponding positions in symbol string X. Thus, with symbol string Y in hand, the only uncertainty in translating symbol string Y to symbol string X is with respect to the occurrence of symbol A in symbol string Y. One can devise a Huffman coding for the three translations 1704 and code symbol string X by using the Huffman codings for each occurrence of the symbol A in symbol string Y. This coding of symbol string X is shown in the sparse array 1706 in FIG. 17. With symbol string Y 1702 in memory, and receiving the 14 bits used to code symbol string X 1706 according to Huffman coding of the symbol A translations 1704, symbol string X can be faithfully and losslessly decoded from symbol string Y and the 14-bit coding of symbol string X 1706 to obtain symbol string X 1708. Fourteen bits used to code 24 symbols represents a rate of 0.583 bits per symbol, which is slightly greater than the theoretical minimum bit rate H[X|Y]=0.574.

Figure 18:
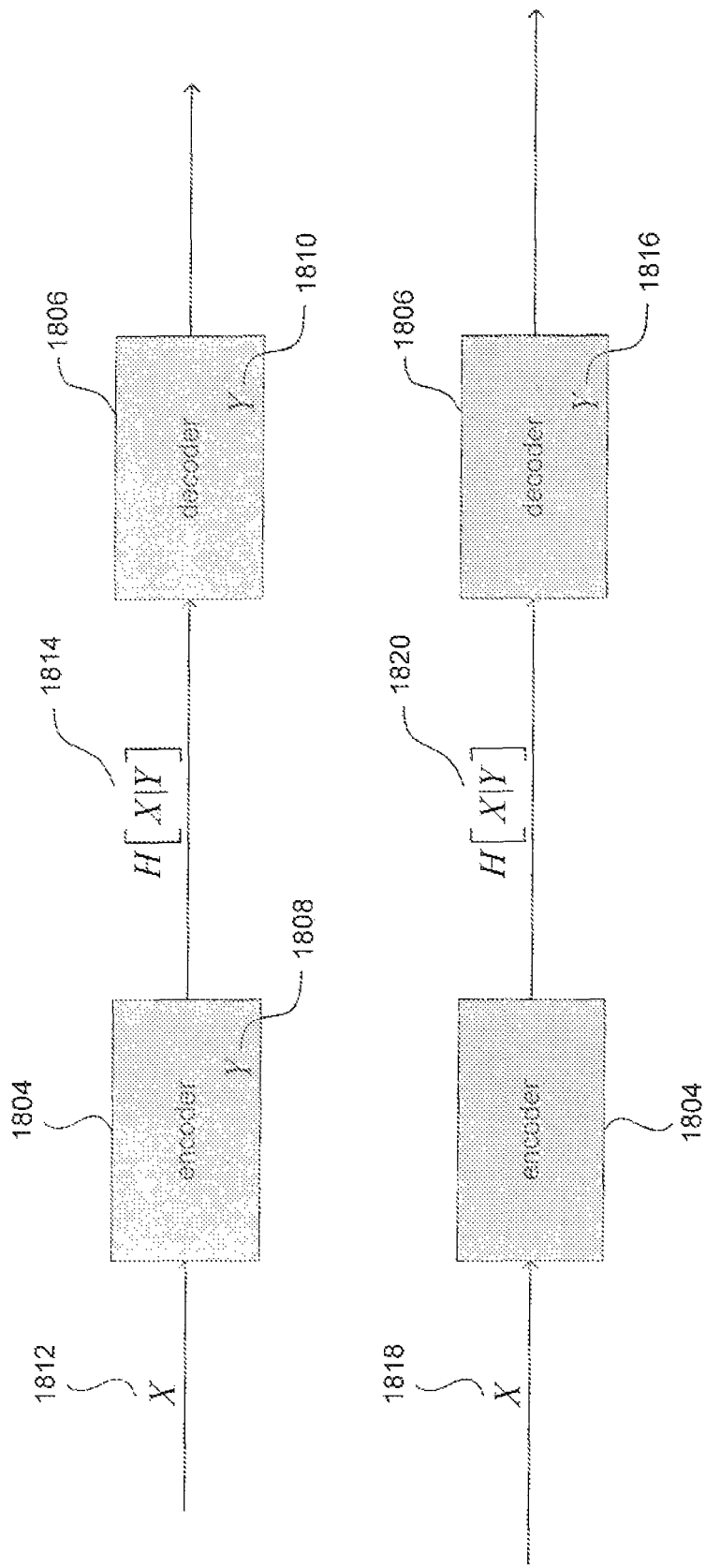
FIG. 18 illustrates the Slepian-Wolf theorem.

FIG. 18 illustrates the Slepian-Wolf theorem. As discussed with reference to FIGS. 16 and 17, if both the coder and decoder of a coder/decoder pair maintain symbol string Y in memory 1808 and 1810 respectively, then symbol string X 1812 can be coded and losslessly transmitted by the coder 1804 to the decoder 1806 at a bit-per-symbol rate of greater than or equal to the conditional entropy H[X|Y] 1814. Slepian and Wolf showed that if the joint probability distribution of symbol strings X and Y is known at the decoder, but only the decoder has access to symbol string Y 1816 then, nonetheless, symbol string X 1818 can be coded and transmitted by the coder 1804 to the decoder 1806 at a bit rate of H[X|Y] 1820. In other words, when the decoder has access to side information, in the current example represented by symbol string Y, and knows the joint probability distribution of the symbol string to be coded and transmitted and the side information, the symbol string can be transmitted at a bit rate equal to H[X|Y].

Figure 19:
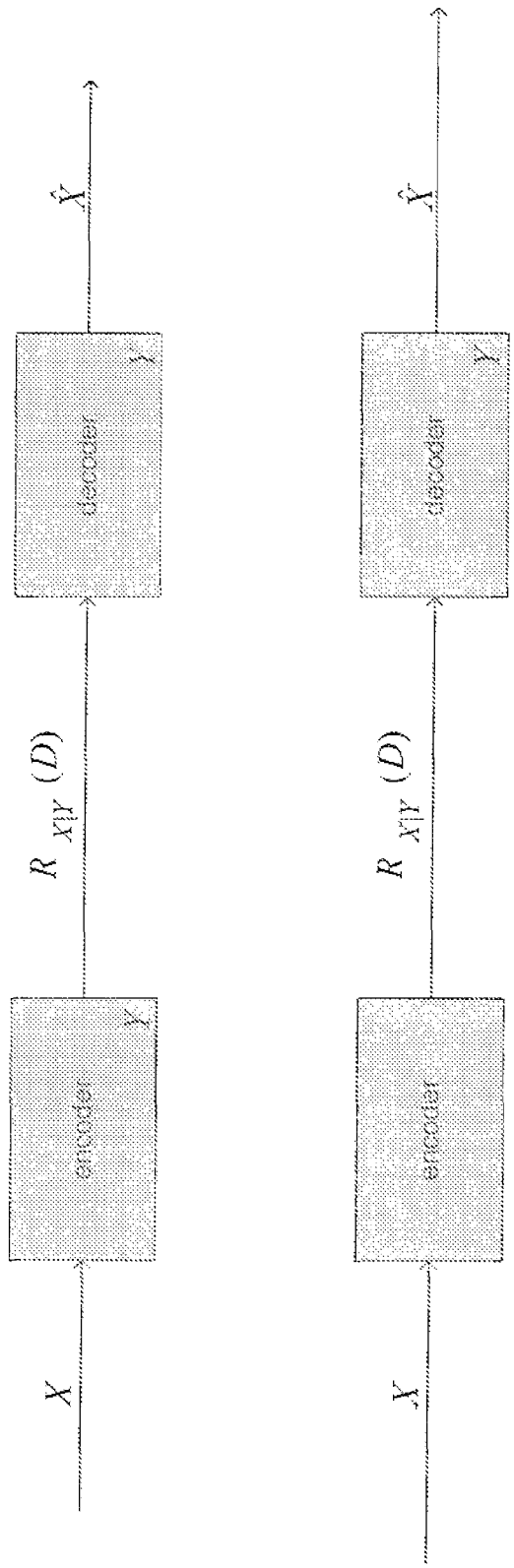
FIG. 19 illustrates the Wyner-Ziv theorem.

FIG. 19 illustrates the Wyner-Ziv theorem. The Wyner-Ziv theorem relates to lossy compression/decompression, rather than lossless compression/decompression. However, as shown in FIG. 19, the Wyner-Ziv theorem is similar to the Slepian-Wolf theorem, except that the bit rate that represents the lower bound for lossy coding and transmission is the conditional rate-distortion function $R_{X|Y}(D)$ which is computed by a minimization algorithm as the minimum bit rate for transmission with lossy compression/decompression resulting in generating a distortion less than or equal to the threshold value D, where the distortion is defined as the variance of the difference between the original symbol string, or signal X, and the noisy, reconstructed symbol string or signal $\hat{X}$.

$$D = \sigma^2(x - \hat{x})$$

$$I(Y; X) = H[Y] - H[Y \mid X]$$

$$R_{X|Y}(D) = \frac{\inf}{\text{conditional probability density function}} I(Y; X), \text{ when } \sigma^2 \le D$$

This bit rate can be achieved even when the coder cannot access the side information Y if the decoder can both access the side information Y and knows the joint probability distribution of X and Y. There are few closed-form expressions for the rate-distortion function, but when memoryless, Gaussian-distributed sources are considered, the rate distortion has a lower bound:

$$R(D) \ge H[X] - H[D]$$

where H [D] is the entropy of a Gaussian random variable with $\sigma^2 \le D$.

Thus, efficient compression can be obtained by the method of source coding with side information when all correlated side information is available to the decoder, along with knowledge of the joint probability distribution of the side information and coded signal. As seen in the above examples, the conditional entropy H[X|Y], and conditional rate-distortion function $R_{X|Y}(D)$ is significantly smaller than H[X] and $R_X(D)$, respectively, when X and Y are correlated. In the related patent application, U.S. patent application Ser. No. 12/548,735, filed concurrently with the current application, methods and systems for Wyner-Ziv information coding with side information are described, and these methods may be employed in embodiments of the present invention, discussed below.

Embodiments of the Present Invention

Figure 20:
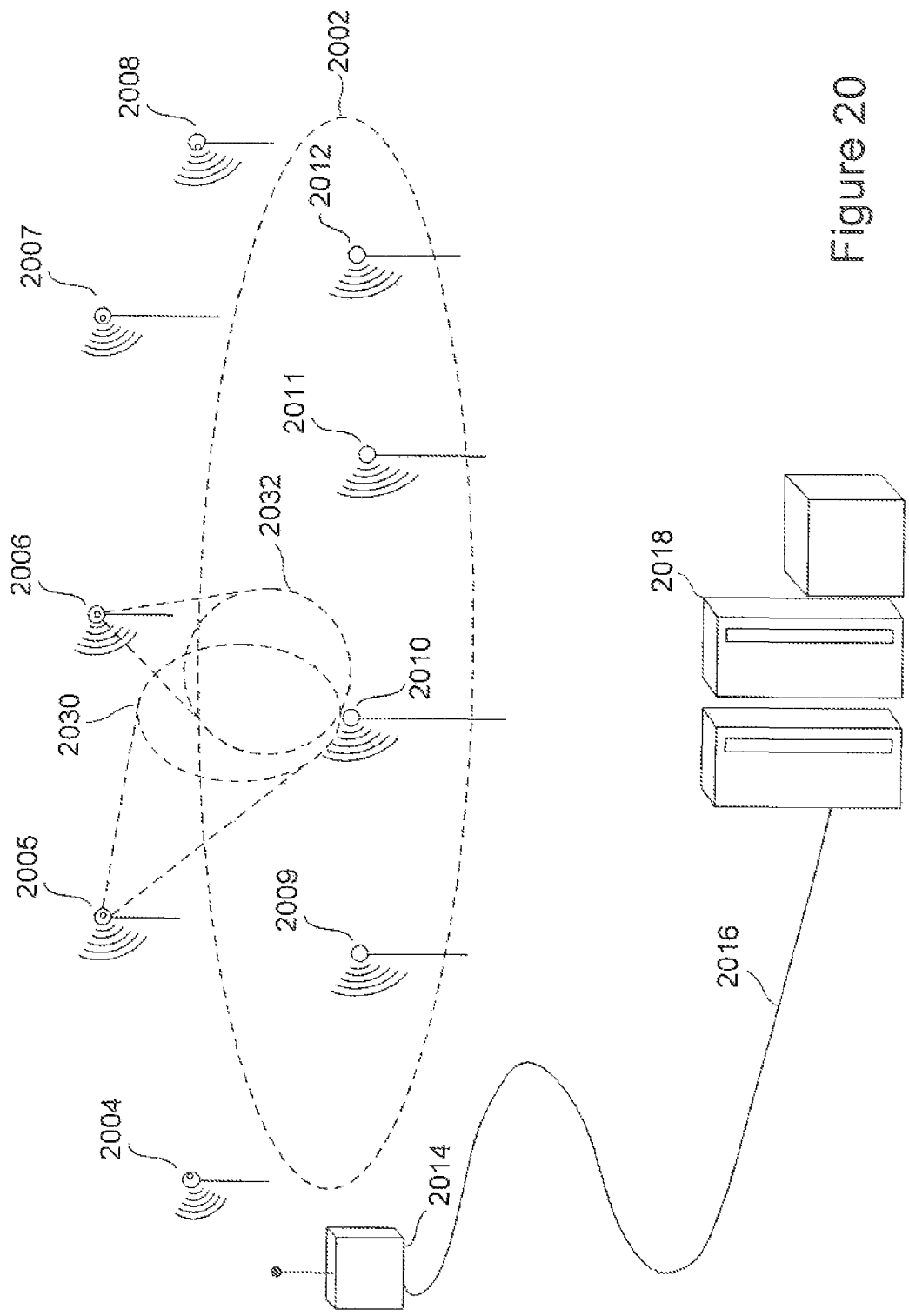
FIG. 20 illustrates a network of wireless camera sensors that provides a context for application of one embodiment of the present invention.

FIG. 20 illustrates a network of wireless camera sensors that provides a context for application of one embodiment of the present invention. In FIG. 20, a region, shown as a disk-shaped area bounded by a dashed circle 2002, is monitored by nine camera sensors 2004-2012 which continuously capture images of the environmental region and transfer the captured images, via wireless communications, to a wireless receiver 2014. The wireless receiver, in turn, transmits the received video images through any of various electronic communications media 2016 to a computer system 2018 that receives the video images and processes the video images received from the camera sensors for various uses. For example, the video signals received from the camera sensors may be output to a panel of displays that are monitored by a human monitor, such as various types of security systems employed for remote monitoring of secure facilities; or processed by automated image-processing systems that monitor the environmental region for certain types of events and, upon detection of the events, generate event-log entries and/or notify human monitors or management personnel. Multi-camera-sensor output may be recorded, by the computer system for a wide variety of additional applications, including scientific observation and data acquisition.

While the bandwidths of electronic communication media have steadily increased, during the past several decades, continuous video signals from multiple camera sensors may nonetheless generate information at a greater rate than can be economically transmitted through available communications media. For that reason, it is common practice for the camera sensors, or information sources, to code and compress the video signal generated by the camera sensors prior to transmission to the computer system 2018. Upon reception by the computer system, the coded, and generally compressed, video signals are decompressed to produce restored video signals of similar resolution to the video signals originally captured by the camera sensors, prior to coding by the camera sensors for transmission. Common video-signal coding techniques, such as those discussed in the previous subsection, can produce 30-fold or greater compression of a video signal, significantly decreasing the bandwidth requirements for transmission at a cost of computational cycles expended by the information source, or camera sensors in the current context, and the information sink, or computer system 2018 in the present context as well as a cost of decreased fidelity, since compression methods are generally at least partially lossy.

In many cases, images of scenes or views captured by camera sensors that monitor the environmental region overlap with one another, and contain significant redundant information. For example, consider camera sensors 2005 and 2006 in FIG. 20 which both are directed to image the same general region 2030 and 2032, respectively, of the monitored environment. Although each camera views the scene from a different perspective, it would be expected that many of the objects in, and the background of, the video frames generated by the two cameras would have common spatial interrelationships, colors, sizes, and positions. Therefore, were the video-frame sequences produced by the two camera sensors aligned and the pairs of video frames viewed together, it would be expected that the pairs of frames would look quite similar, even to a casual observer. Even video frames captured by non-adjacent camera sensors may, in the environmental-monitoring context illustrated in FIG. 20, still contain a significant amount of redundant information. While individual coding and decoding of the video signals generated by each camera sensor, or information source, may achieve a reasonable compression rate for each video signal, it would be expected that, due to the large amount of common information generated and coded by the nine camera sensors, an even greater compression rate would be achievable were the camera sensors able to cooperate and jointly code captured video frames together in a distributed-computing fashion. As one example, were two camera sensors sufficiently close together, a simple difference computed for two frames generated at the same time by the two camera sensors would produce a difference frame, and compression of the difference frame and one of the two original frames would be expected to produce fewer coded bits than separate compression of the two original frames.

Unfortunately, the camera sensors used for monitoring and data-collection purposes tend to be low-powered devices with significant computational constraints, including relatively slow processors and relatively small amounts of internal memory. Furthermore, the camera sensors generally lack both the computational and communications capabilities for cooperative information coding. Instead, each camera sensor has sufficient computational bandwidth and communications capability to separately code the video frames captured by the camera sensor and transmit the coded frames to the local receiving device 2014, as well as to synchronize frame generation and frame coding with other camera sensors in the network of camera sensors.

Figure 21:
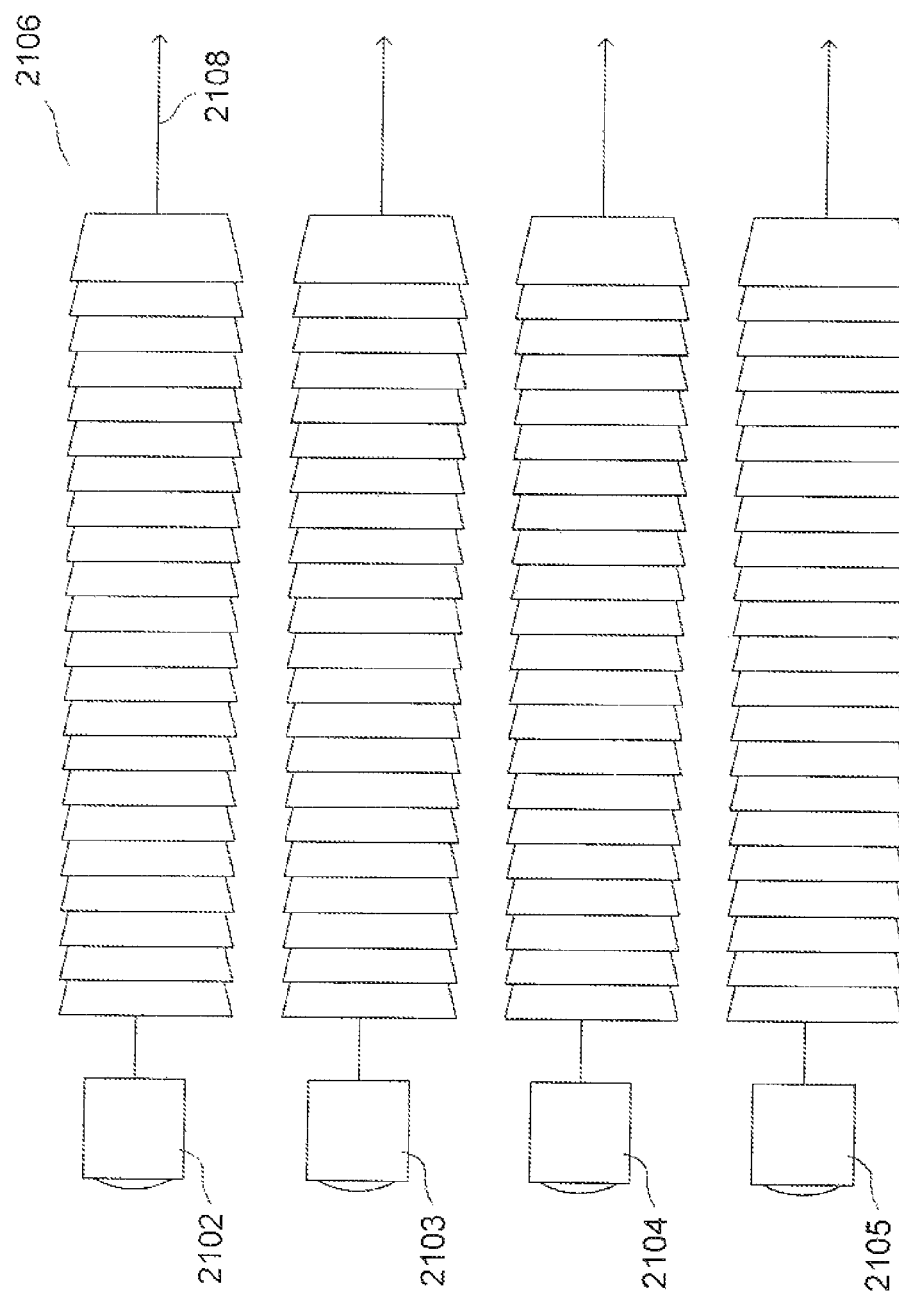
FIG. 21 illustrates four camera sensors and video signals produced by the four camera sensors.
Figure 22:
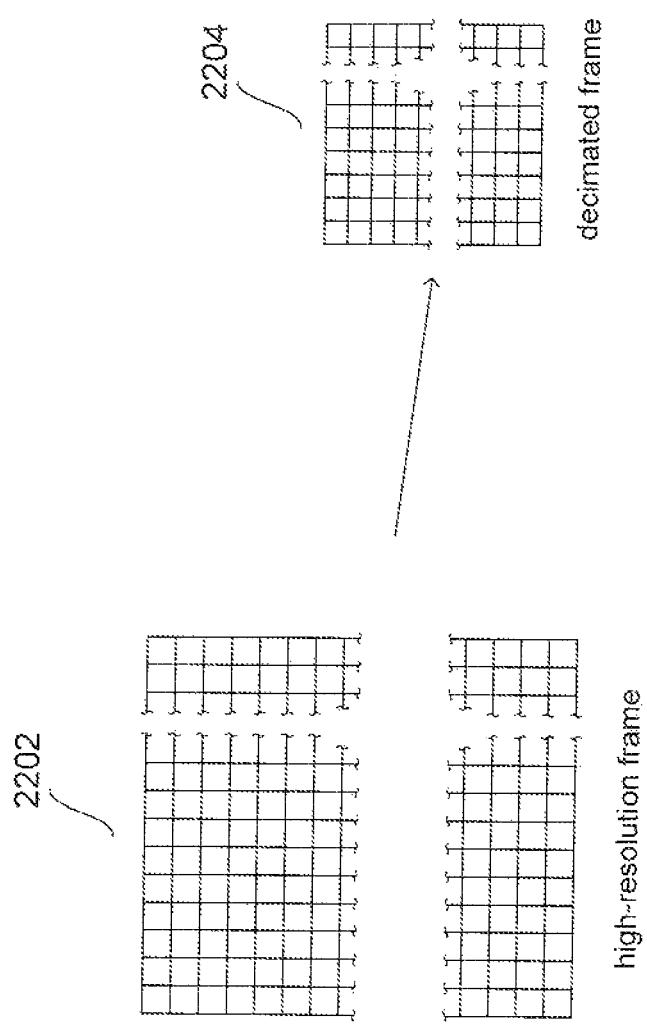
FIG. 22 illustrates a decimation operation used in video and still-image frame processing.
Figure 23:
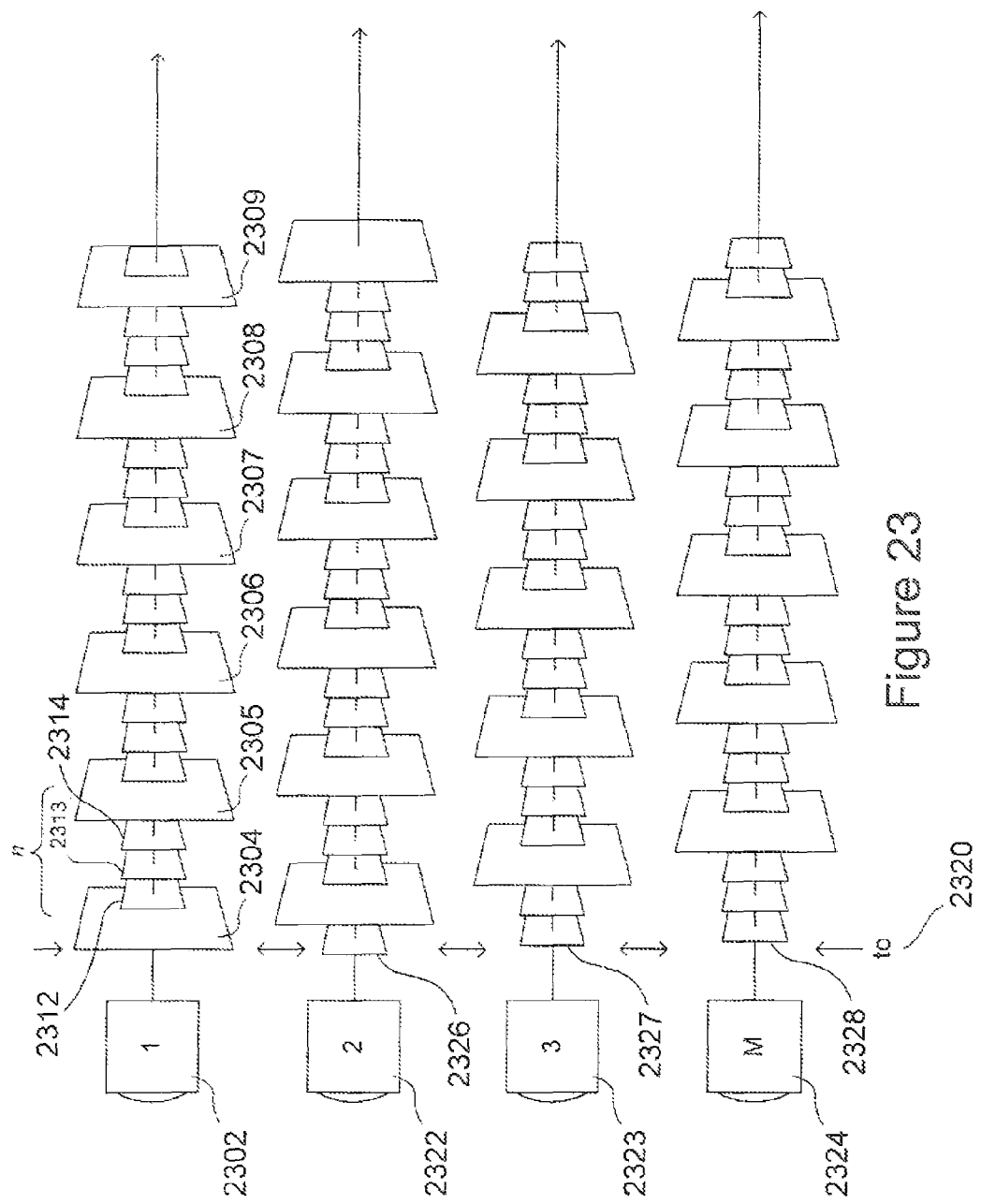
FIG. 23 illustrates an underlying concept of method and system embodiments of the present invention, using illustration conventions of FIGS. 21 and 22.

FIGS. 21-23 illustrate a basic premise of various embodiments of the present invention. FIG. 21 illustrates four camera sensors and video signals produced by the four camera sensors. The four camera sensors 2102-2105 are representative of an arbitrary number of camera sensors m that may feed video signals through a local receiving device (2014 in FIG. 20) to a computer-system information sink (2018 in FIG. 20). The cameras produce a steady stream of video frames represented, in FIG. 21, by a sequence of video frames, such as sequence of video frames 2106, spaced at even intervals along a time line, such as time line 2108. Although the camera sensors lack sufficient computational bandwidth and communications capabilities for distributed, cooperative video-signal coding, the cameras have sufficient communications capabilities and computational bandwidth for synchronizing video-frame generation and coding with one another.

Camera-sensor synchronization can be implemented in many different ways. For example, the cameras may have access to a common, external clock and may agree, among themselves, at initial power-up and whenever a new camera joins the network, to a mapping, or correspondence, between the timing of video frame transmission and regularly spaced ticks of the common, external clock. In alternative implementations, one of the networked camera sensors may assume the role of a master that drives video-frame generation and transmission by the remaining camera sensors. However synchronization is implemented, monitoring of synchronization and periodic re-synchronization operations are generally carried out to maintain synchronization and to ensure that the video-frame sequences emitted by each camera are generally aligned with one another, in time, as shown in FIG. 21.

FIG. 22 illustrates a decimation operation used in video and still-image frame processing. A high-resolution frame 2002 with y pixels in each vertical column and x pixels in each horizontal row can be decimated to produce a lower-resolution, decimated frame 2204 with y/n pixels in each vertical column and x/n pixels in each horizontal row, where n is the decimation factor. In general, every $n^{th}$ pixel in the vertical and horizontal directions is selected, in checkerboard-like fashion, to produce the lower-resolution image. A reverse operation, referred to as "upsampling," transforms an y/n×x/n low-resolution image back to a y×x high-resolution image. However, upsampling of a low-resolution image generally cannot exactly reproduce the pixels that are decimated from an original high-resolution image from which the low-resolution image is produced. Therefore, in general, a linear interpolation process, or a more complex interpolation process, is used during upsampling to determine appropriate pixel values for the pixels added to the low-resolution image to generate a high-resolution image. Thus, decimation is a lossy process in which information is lost, and upsampling attempts to algorithmically recover the lost information using that portion of the original information preserved in the low-resolution image. In general, an upsampled image produced from a low-resolution image is not identical to the original high-resolution image that was decimated to produce the low-resolution image. Linear interpolation provides only estimates of the true pixel values of decimated pixels.

FIG. 23 illustrates an underlying concept of method and system embodiments of the present invention, using illustration conventions of FIGS. 21 and 22. In order to achieve higher compression rates, each camera sensor, such as camera sensor 2302, produces a mixed-resolution video-stream output. High-resolution frames are output at a regular interval of every $n^{th}$ output frame. For example, in FIG. 23, camera sensor 2302 produces the high-resolution frames 2304-2309 at regular intervals, and, in between each high-resolution frame, outputs three low-resolution decimated frames, such as the three low-resolution decimated frames 2312-2314 that are output, in time, between output of high-resolution frames 2304 and 2305. The decimation operation substantially decreases the number of information bits in the output video stream. Each camera sensor in a network of camera sensors produces a similar mixed-resolution output video signal, but the camera sensors offset output of high-resolution frames from one another, as shown in FIG. 23, so that, at any point in time in which a video frame is output, at least one high-resolution frame is output by at least one camera sensor in a group of correlated camera sensors. Thus, in FIG. 23, at a time $t_0$ 2320, the first camera sensor 2302 outputs a high-resolution frame 2304 while the remaining camera sensors 2322-2324 output low-resolution, decimated frames, 2326-2328 respectively.

It is permissible for more than one high-resolution frame to be output at a particular point in time, particularly in sensor networks in which images produced by the camera sensors overlap to different extents. For example, returning to FIG. 20, it would be expected that images produced from camera sensor 2006 would significantly overlap with images produced from camera sensors 2005 and 2007. However, the frames produced by camera sensors 2004 and 2008 would be expected to overlap less significantly with frames produced by camera sensor 2006, the frames produced by camera sensors 2004 and 2008 may have comparatively little overlap. Thus, in such situations, it is important that, for each group of camera sensors with significantly overlapping images, at least one high-resolution frame is emitted by at least one of the camera sensors in the group at each point in time.

The low-resolution frames in the mixed-resolution video signals are generated by a decimation operation. The intent of the coding and decoding methods and systems of the present invention is that, when the mixed-resolution video signals are coded by the camera sensors and transmitted to the computer system which decodes the coded signals, the computer system can use the high-resolution frame or frames, transmitted at each point in time, to assist in upsampling the low-resolution frames from other camera sensors emitted at the same time, and the upsampled frames can, in turn, be used as side information for decoding Laplacian-residual frames to generate high-resolution frames that are close to the original, high-resolution frames decimated by the camera sensors. In other words, even though significant information is lost by decimation and coding a frame on a first camera sensor, much of the lost information can be recovered from decoded high-resolution frames generated and coded by other camera sensors.

Figure 24:
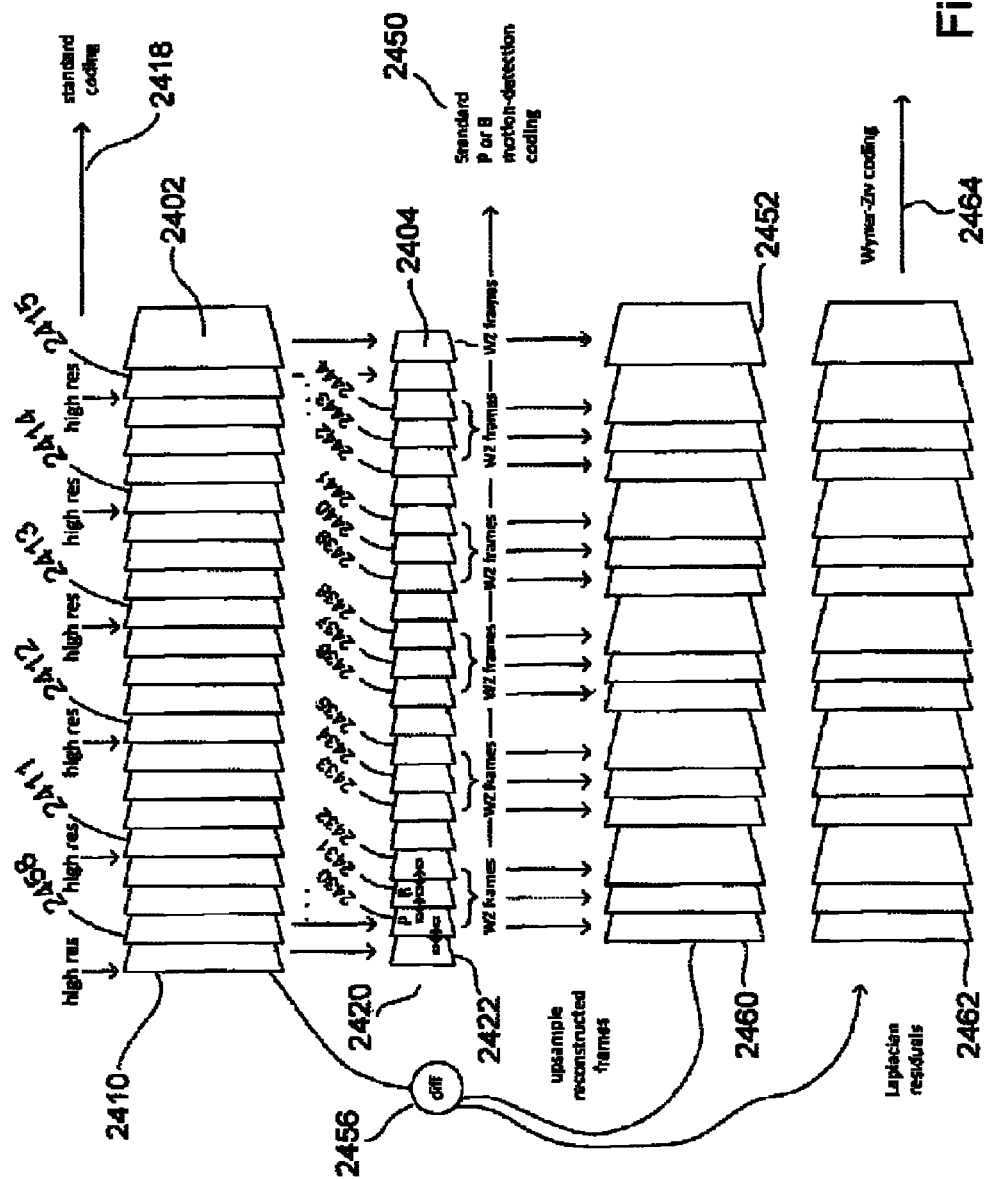
FIG. 24 illustrates the coding process undertaken by an information source according to one embodiment of the present invention.

FIG. 24 illustrates the coding process undertaken by an information source according to one embodiment of the present invention. In the wireless-network-of-sensor-camera context, discussed above with reference to FIG. 20, the camera sensors are information sources. Each information source produces a high-resolution video frame, such as high-resolution video frame 2402, at regular intervals in time. In FIG. 24, an implied time axis runs horizontally across the page, and the various frame sequences shown in FIG. 24 are aligned with respect to this axis. Each high-resolution frame is decimated, by a decimation operation as discussed in FIG. 21, to produce a corresponding low-resolution frame, such as low-resolution frame 2404. As discussed above, with respect to FIG. 23, the camera sensor can be thought of as outputting a high-resolution frame at every $n^{th}$ output frame, and outputting low-resolution intervening frames between high-resolution frames. Thus, high-resolution frames 2410-2415 together comprise a sequence of high-resolution frames output by the camera sensor. As indicated in FIG. 24, these frames are coded by a standard video-coding method 2418, as discussed in the previous subsections. In the discussion provided below, standard coding methods are non-Wyner-Ziv coding methods, including MPEG and H.264 coding methods, the corresponding decoding methods for which do not depend on side information. Within the sequence of low-resolution frames 2420, those low-resolution frames, such as low-resolution frame 2422, that correspond to a high-resolution frame output by the camera sensor are used only as reference frames during coding of the remaining low-resolution frames, referred to as "WZ-frames" in the following discussion.

In FIG. 24, low-resolution frames 2430-2444 and 2404 together comprise the WZ-frames within the sequence of low-resolution frames 2420. As indicated in FIG. 24, these WZ-frames are also coded, by a standard video-coding method 2450, including the use of motion detection. During the video-coding process, a reconstructed WZ-frame is produced for each WZ-frame coded, as part of the video-coding procedure, as discussed in the previous subsections. These reconstructed WZ-frames are then upsampled to produce an upsampled frame for each WZ-frame, such as upsampled frame 2452 corresponding to low-resolution WZ-frame 2404. Each upsampled frame is then subtracted, in a pixel-by-pixel subtraction operation, from the corresponding high-resolution frame, as indicated by the difference operation 2456 for high-resolution frame 2458 and upsampled frame 2460 in FIG. 24, to produce a corresponding Laplacian residual frame, such as Laplacian residual frame 2462 generated from upsampled frame 2460 and from high-resolution frame 2458. The Laplacian residual frames are then coded using Wyner-Ziv coding methods 2464 to produce a third stream of coded information, in addition to the coded low-resolution WZ-frames 2450 and the stream of coded high-resolution frames 2418. Suitable methods and systems for Wyner-Ziv coding and decoding are disclosed in the related patent application, U.S. patent application Ser. No. 12/548,735, filed concurrently with the current application. All three coded streams are transmitted to the information sink (2018 in FIG. 20).

Figure 25:
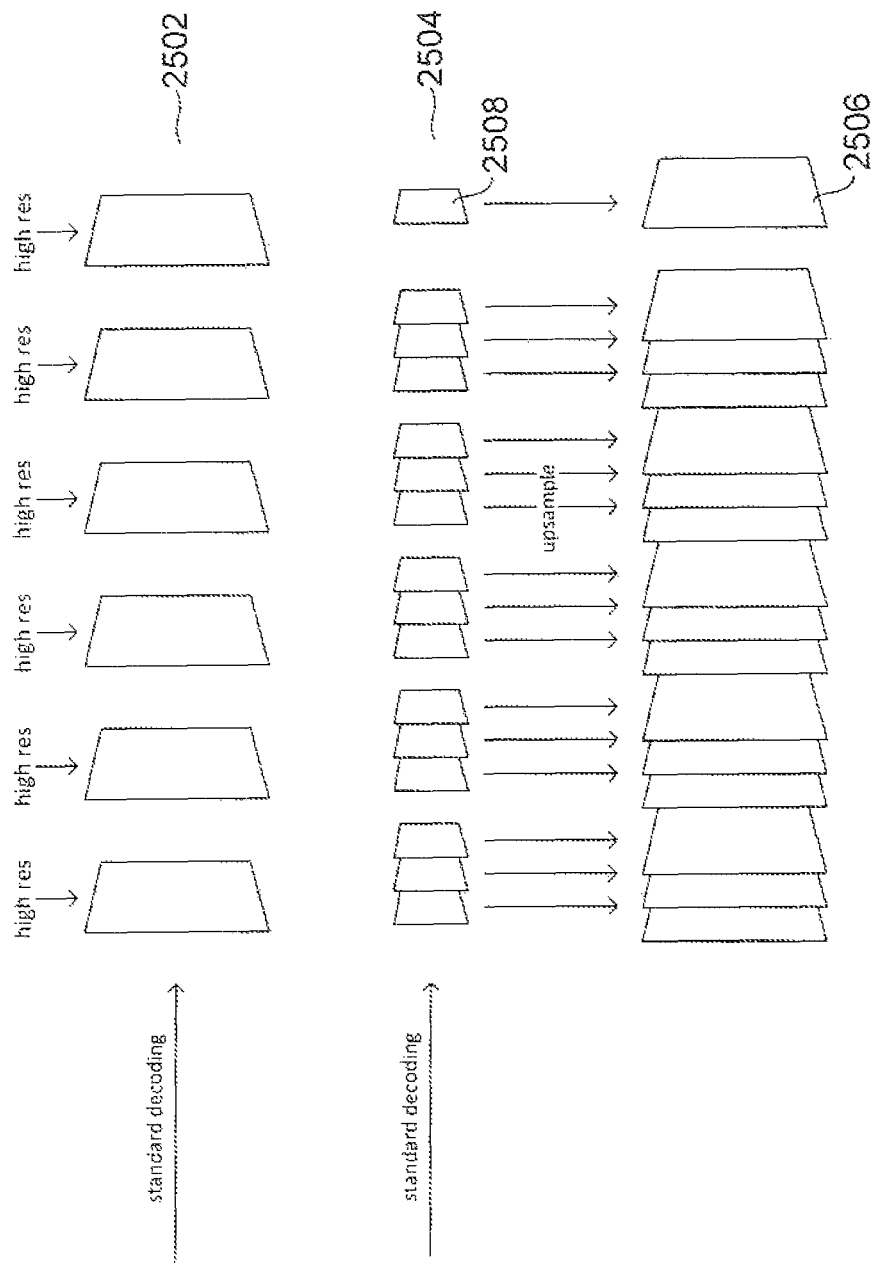
FIGS. 25-28 illustrate decoding of coded information according to one embodiment of the present invention.

FIGS. 25-28 illustrate decoding of coded information according to one embodiment of the present invention. As discussed above with reference to FIG. 24, each low-power, computationally constrained information source produces three streams of coded information: (1) a standard coding of every $n^{th}$ high-resolution frame; (2) standard video coding of the low-resolution WZ-frames; and (3) a Wyner-Ziv coding of Laplacian residual frames. The information sink receives the three coded streams from each information source and, as shown in FIG. 25, employs standard decoding techniques in order to produce decoded high-resolution frames 2502 and the low-resolution WZ-frames 2504 from the first two coded streams, mentioned above. The non-WZ-frame low-resolution frames needed for low-resolution-frame decoding can be obtained, at the information sink, by decimating corresponding, already-decoded high-resolution frames. Each of the decoded, low-resolution WZ-frames is, as shown in FIG. 25, upsampled to produce corresponding upsampled decoded frames, such as upsampled decoded frame 2506 corresponding to low-resolution WZ-frame 2508.

Figure 26:
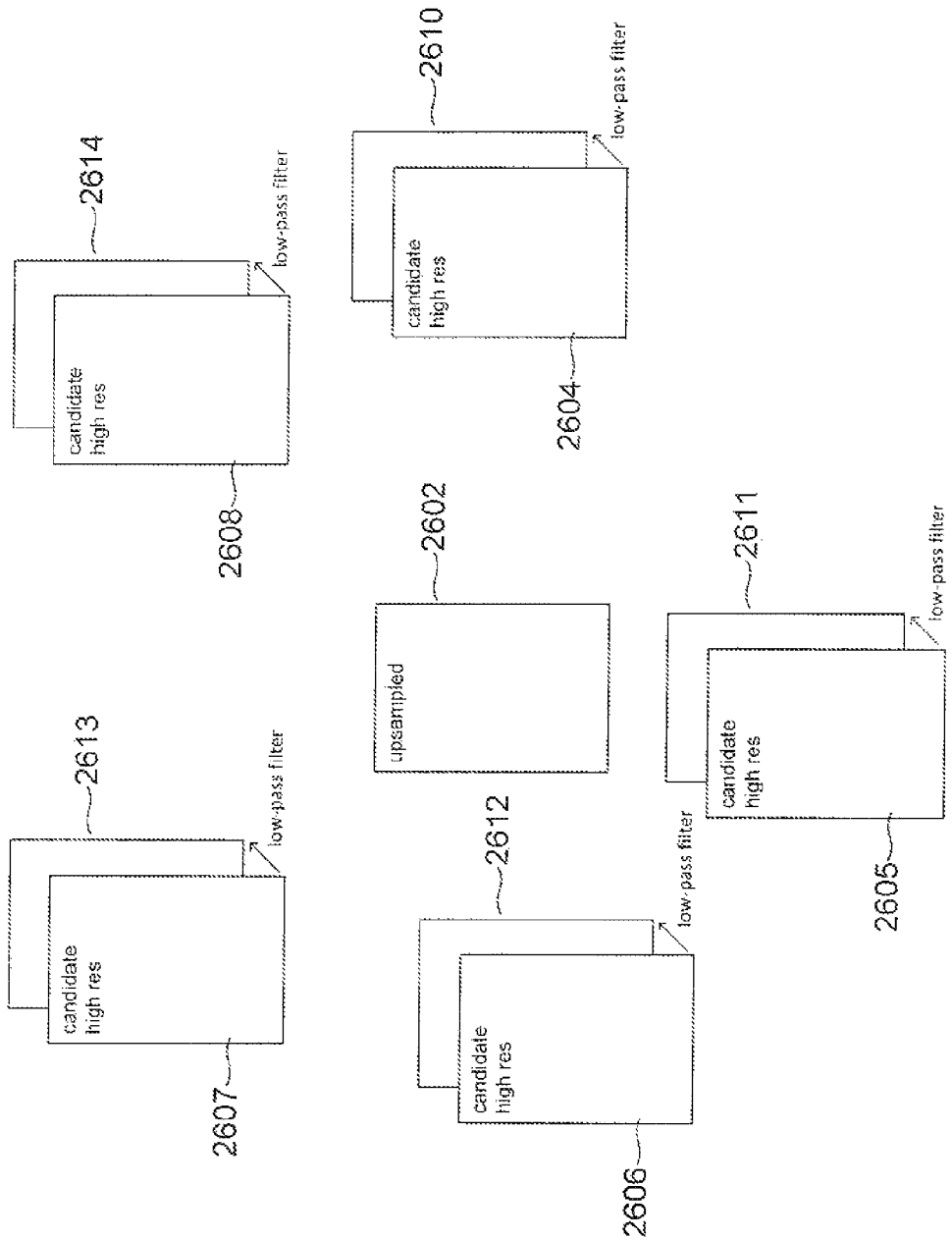

For each upsampled decoded WZ-frame 2602, as shown in FIG. 26, the information sink identifies a number of corresponding candidate high-resolution frames 2604-2608. The candidate high-resolution frames are already-decoded high-resolution frames that are likely to significantly overlap, in content, the currently-considered upsampled decoded WZ-frame (2602 in FIG. 26). Candidate high-resolution frames may include a high-resolution frame, decoded by standard decoding techniques, which was coded and transmitted at the same time as the currently-considered upsampled frame by a different information source. Returning to FIG. 23, the candidate high-resolution frames for the upsampled decoded frames corresponding to coded low-resolution frames 2326-2328 include the high-resolution frame 2304 coded and transmitted to the information sink by the first camera sensor 2302. Additional candidate high-resolution frames may include already decoded high-resolution frames from the same camera sensor that immediately precede or immediately follow the low-resolution WZ-frame corresponding to the currently-considered upsampled low-resolution WZ-frame in the original output frame sequence. Referring back to FIG. 23, the high-resolution frames 2304 and 2305 that immediately precede and immediately follow, respectively, low-resolution frames 2312-2314 may be selected, upon decoding, as candidate frames with respect upsampled decoded low-resolution frames corresponding to originally-transmitted low-resolution frames 2312-2314. Additional candidate high-resolution frames may include already decoded WZ-frames proximal in original capture time to the low-resolution WZ-frame from which the currently-considered upsampled frame is generated. The candidate frames, as shown in FIG. 26, are subjected to low-pass filtering to generate low-pass-filtered candidate frames 2610-2614.

Figure 27:
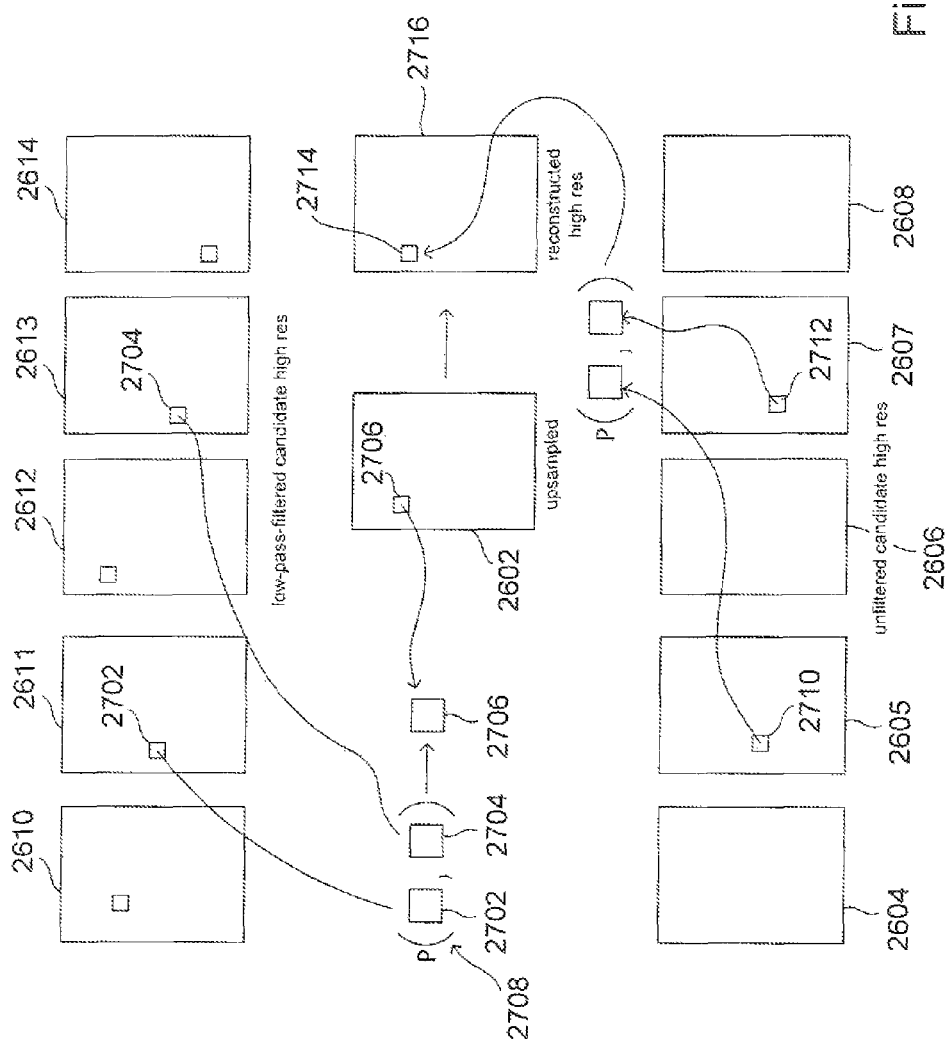

Next, as shown in FIG. 27, for each macroblock in the currently-considered upsampled frame 2602, predictive macroblocks within the low-pass-filtered candidate frames 2610-2614 are found. In certain cases, two predictive macroblocks are found by comparing macroblocks in the low-pass-filtered candidate frames to a currently-considered macroblock in the currently-considered upsampled frame using any of various comparison metrics, such as the sum of absolute differences ("SAD") metric. The predictive macroblocks 2702 and 2704 for a currently-considered macroblock 2706 in the currently-considered upsampled frame 2602 are then used to compute a predictor function P 2708 that predicts the currently-considered macroblock 2706 when furnished with the two best matching macroblocks 2702 and 2704 as arguments.

Alternatively, a dense matching method may be used. A dense correspondence map can be computed between two images using an optical-flow technique. In the current case, a low-resolution version of an image from one view can be used to obtain an approximate dense map between the low-resolution version of the image and a high-resolution image from a second view and the image, and then project the high-resolution image to the low-resolution image using the map to obtain a high-resolution version of the low-resolution view. More generally, motion vectors, which can be dense or sparse, may be found and used to project the high-resolution image to the low-resolution image. When the confidence in the motion vector is sufficiently high, the projected high-resolution image can be used as a final reconstructed image. Otherwise, the low-resolution image can be spatially upsampled to obtain the final reconstruction for the region of support of the motion vectors. Ideally, the projection of the high-resolution image should be done so that only the high-frequency components are added.

A variety of different predictor functions can be used. One predictor function is a simple system of linear equations that relate the best two matching macroblocks from the low-pass-filtered candidate frames (2702 and 2704 in FIG. 27) to the currently-considered macroblock (2706 in FIG. 27) of the currently-considered upsampled frame (2602 in FIG. 27). Considering the 16×16 macroblocks to be vectors of length 256, a system of equations corresponding to the predictor function is:

$$W_1(A_1 + B_2) = C_1$$
$$W_2(A_2 + B_2) = C_2$$
$$\vdots$$
$$W_{256}(A_{256} + B_{256}) = C_{256}$$

where
A and B are vectors corresponding to the best marching macroblocks;
C is a vector corresponding to the currently considered macroblock from the currently considered upsampled frame; and
W is a vector of weights.

Thus, finding a predictor that relates the two best matching macroblocks to the currently-considered macroblock constitutes solving the linear equations to determine the vector of weights W. Many other predictor functions may be used, including predictor functions that determine a pixel value for the currently-considered macroblock from a neighborhood of pixel values within the two best matching macroblocks and predictors that employ more than two matching macroblocks.

Figure 28:
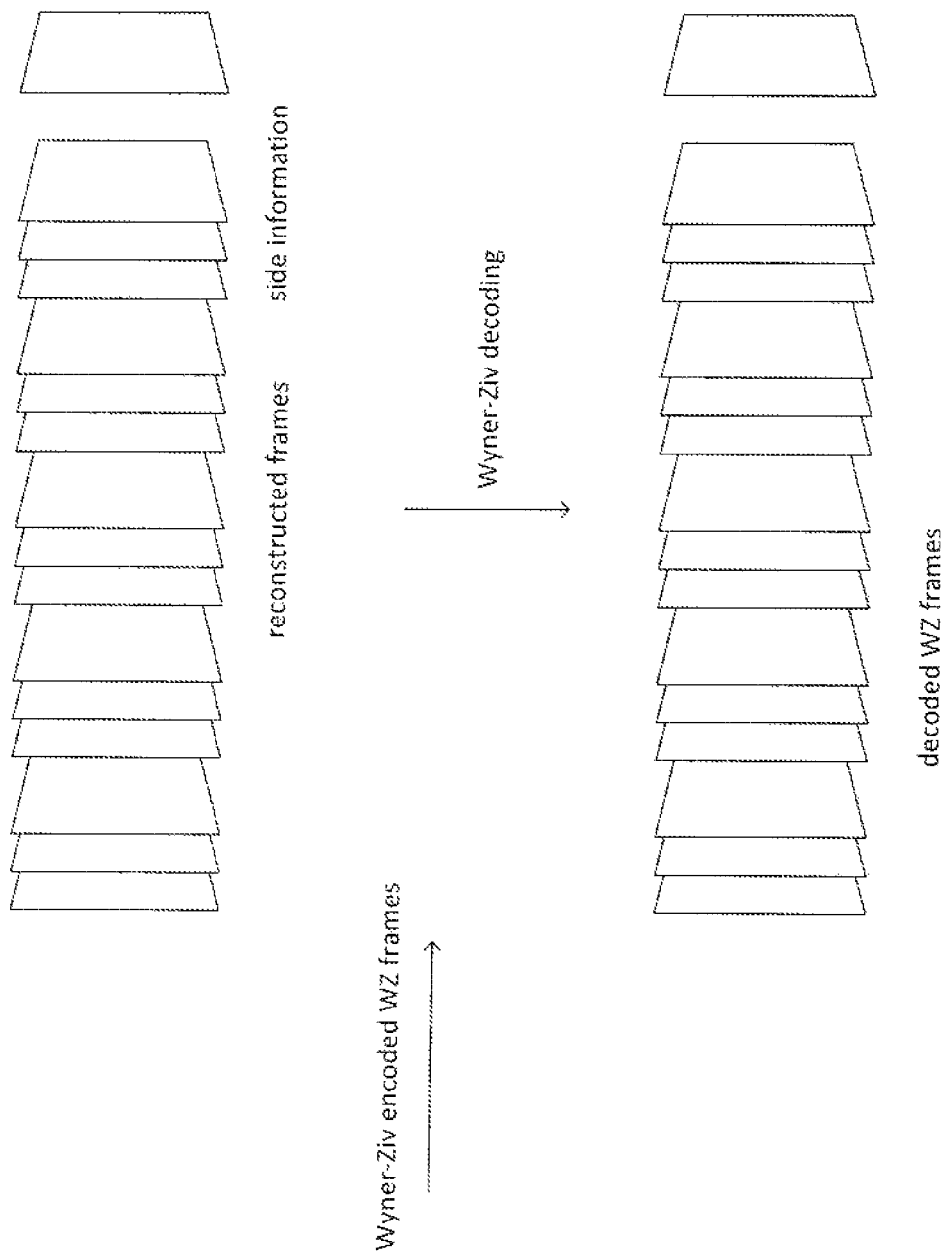

Once the prediction function is determined for the currently-considered macroblock, as shown in FIG. 27, the prediction function is then applied to macroblocks in the unfiltered candidate high-resolution frames (2710 and 2712 in FIG. 27) that correspond to the best matching macroblocks (2702 and 2704) to produce a reconstructed macroblock 2714 for the currently-considered macroblock 2706 that is inserted into a reconstructed high-resolution frame 2716 corresponding to the currently-considered upsampled frame 2602. In other words, the reconstructed frame for an upsampled frame is generated by applying a predictor function to macroblocks in the unfiltered candidate high-resolution frames for a currently-considered upsampled frame. The reconstructed high-resolution frames, such as reconstructed high-resolution frame 2716 in FIG. 27, are then used as side information for Wyner-Ziv decoding of the Wyner-Ziv coded WZ-frames to produce decoded WZ-frames, as shown in FIG. 28. The decoded WZ-frames are then combined with the decoded high-resolution frames (2502 in FIG. 25) to produce a final, decoded video-frame stream close, but generally not identical, to the originally coded video-frame stream (2106 in FIG. 21) for a camera sensor.

Figure 29A:
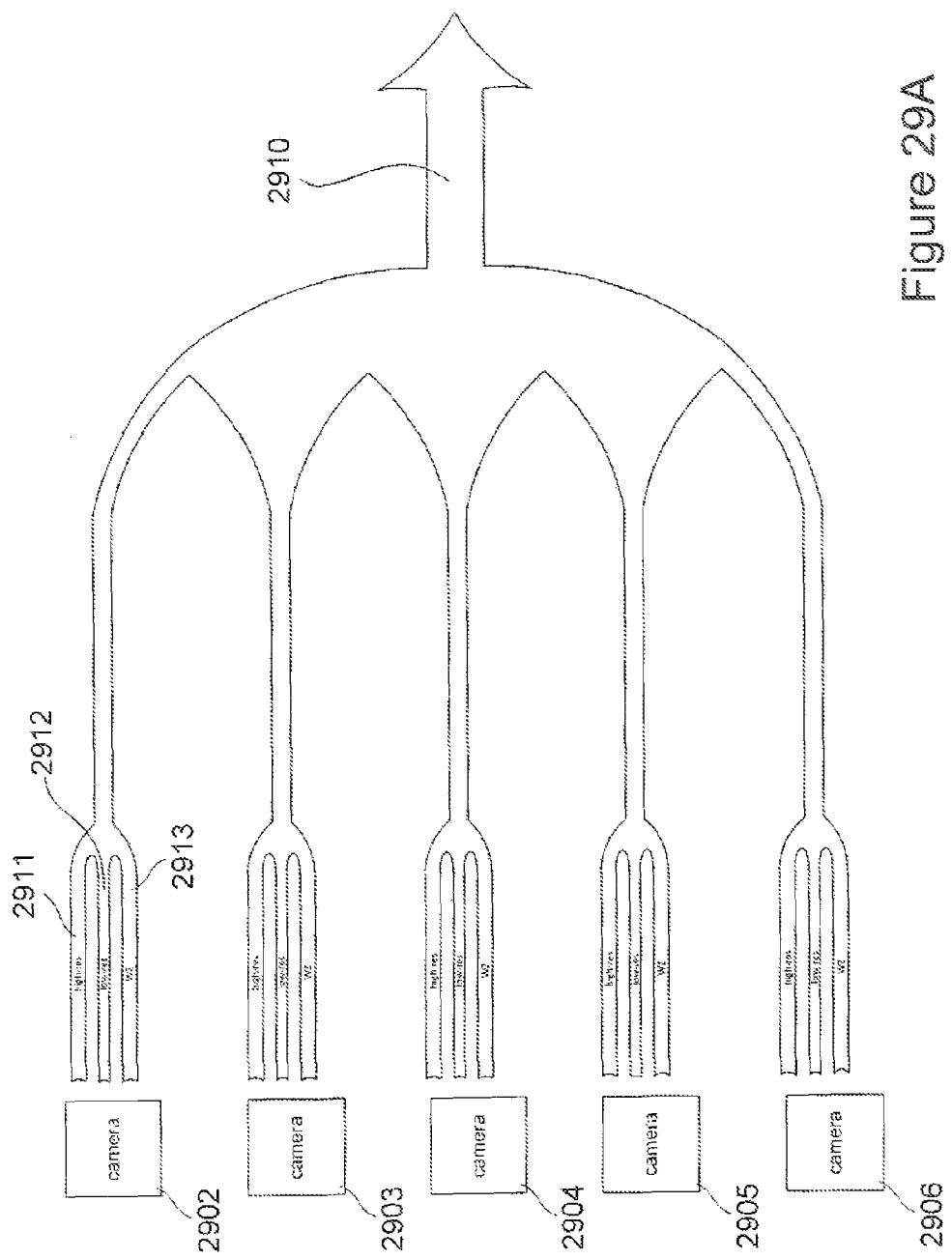
FIGS. 29A-B illustrate coded-information transmission from information sources to an information sink according to embodiments of the present invention.
Figure 29B:
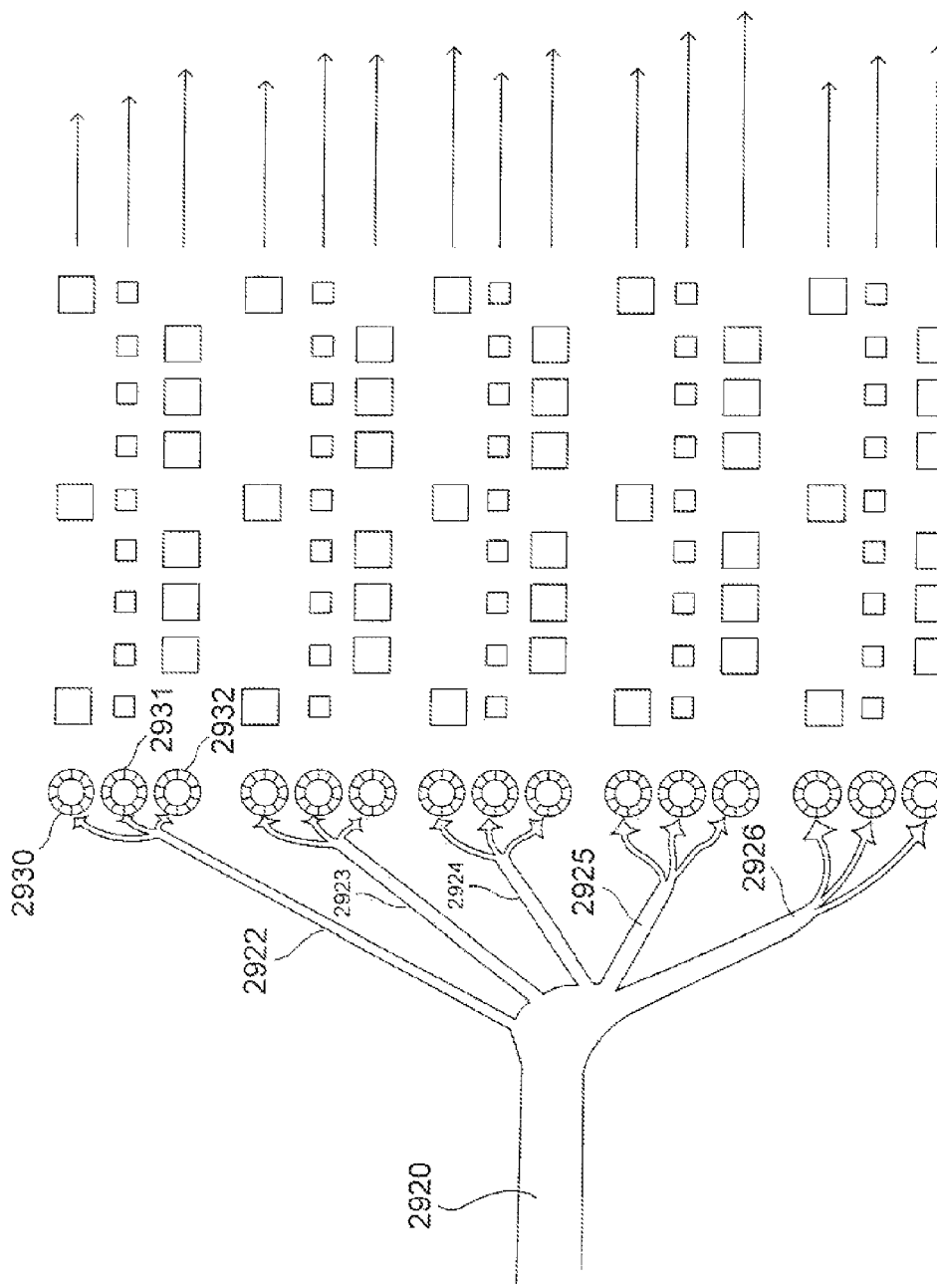

FIGS. 29A-B illustrate coded-information transmission from information sources to an information sink according to embodiments of the present invention. In FIG. 29A, five information sources 2902-2906 each generate three coded information streams, as discussed above with reference to FIG. 24, that are merged together to produce a final stream of coded information 2910 that is transmitted to the information sink. In certain embodiments of the present invention, the streams of coded information emanating from each information source are packetized and the packets are merged together to form a single stream of packets output by each information source. In one embodiment of the present invention, a local receiver (2014 in FIG. 20) receives the stream of packets from multiple information sources and combines the stream of packets together into a single packet stream that is transmitted through one or more electronics communication media to the information sink. In one embodiment of the present invention, each packet contains coded information from one coded-information stream output by a particular information source, and a packet header identifies the information source and which of the three coded-information streams emanating from the information source to which the packet corresponds. In other embodiments of the present invention, a given packet may contain blocks of coded information from multiple coded-information streams, with internal headers that identify the information source and coded-information stream for each block. In general, the packet transmission is carried out on an approximately first-come, first-serve basis, with additional fairness considerations, so that, at the information sink, the coded information corresponding to high-resolution frames and low-resolution WZ-frames generated by information sources at a particular point in time are received within a reasonably short, maximum time interval, so that the information sink can use candidate frames from multiple information sources during decoding of WZ-frames.

FIG. 29B shows reception of the stream of coded information from multiple information sources by an information sink, according to one embodiment of the present invention. The incoming stream of coded-information-containing packets 2920 is demultiplexed, using information in packet headers, to direct the packets first to coded-information channels corresponding to information sources 2922-2926 and, within a particular channel, to an input queue corresponding to a particular coded information stream emanating from the information source. For example, in FIG. 2913, input queues 2930-2932 correspond to the three coded information streams 2911-2913 (FIG. 29A) produced by information source 2902 (FIG. 29A). The information sink then dequeues packets of coded information from the input queues in order to carry out the decoding method discussed above with reference to FIGS. 25-28.

Figure 30A:
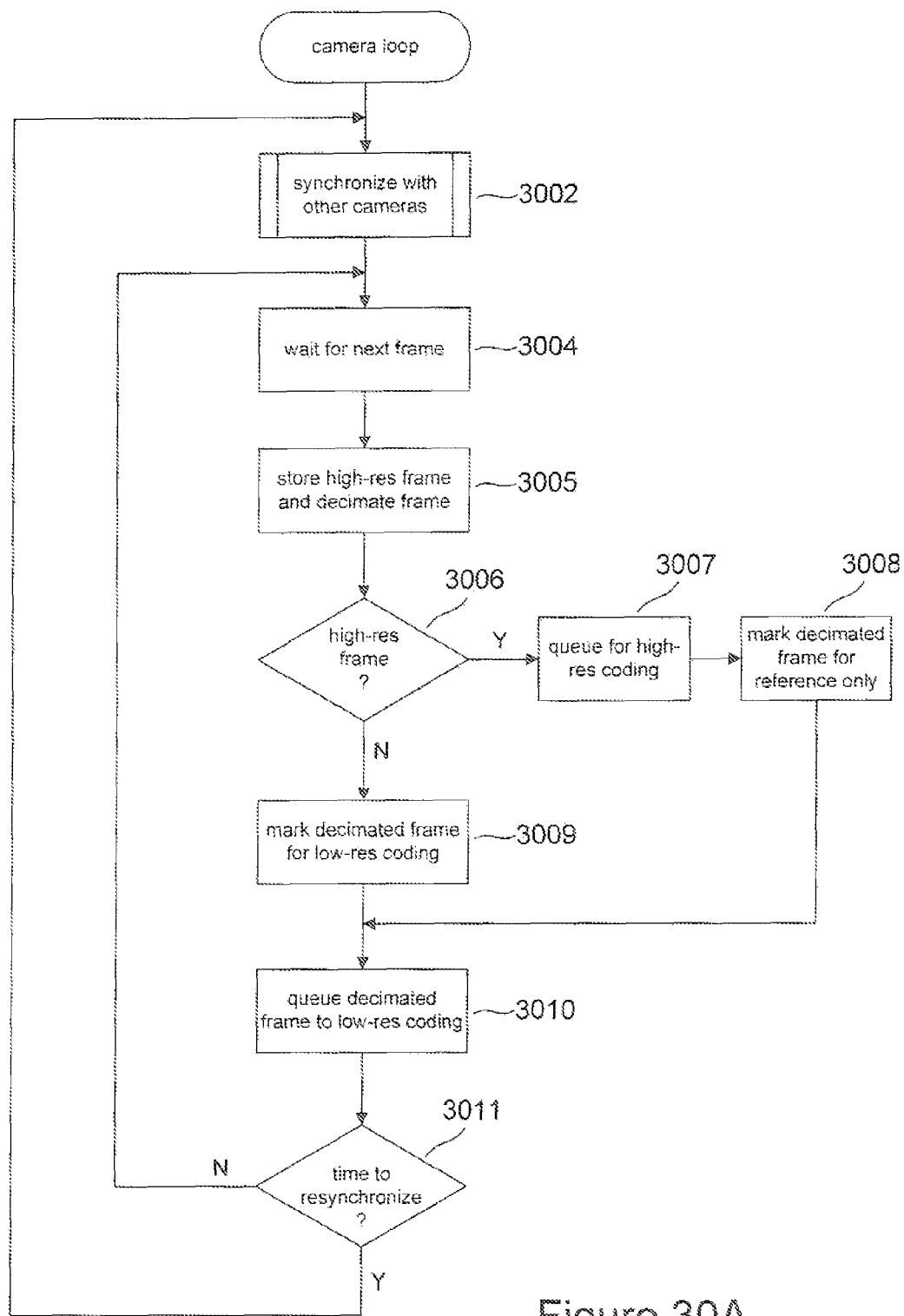
FIGS. 30A-F provide control-flow diagrams for an information-coding and coded-information-decoding method and system that represents one embodiment of the present invention.
Figure 30B:
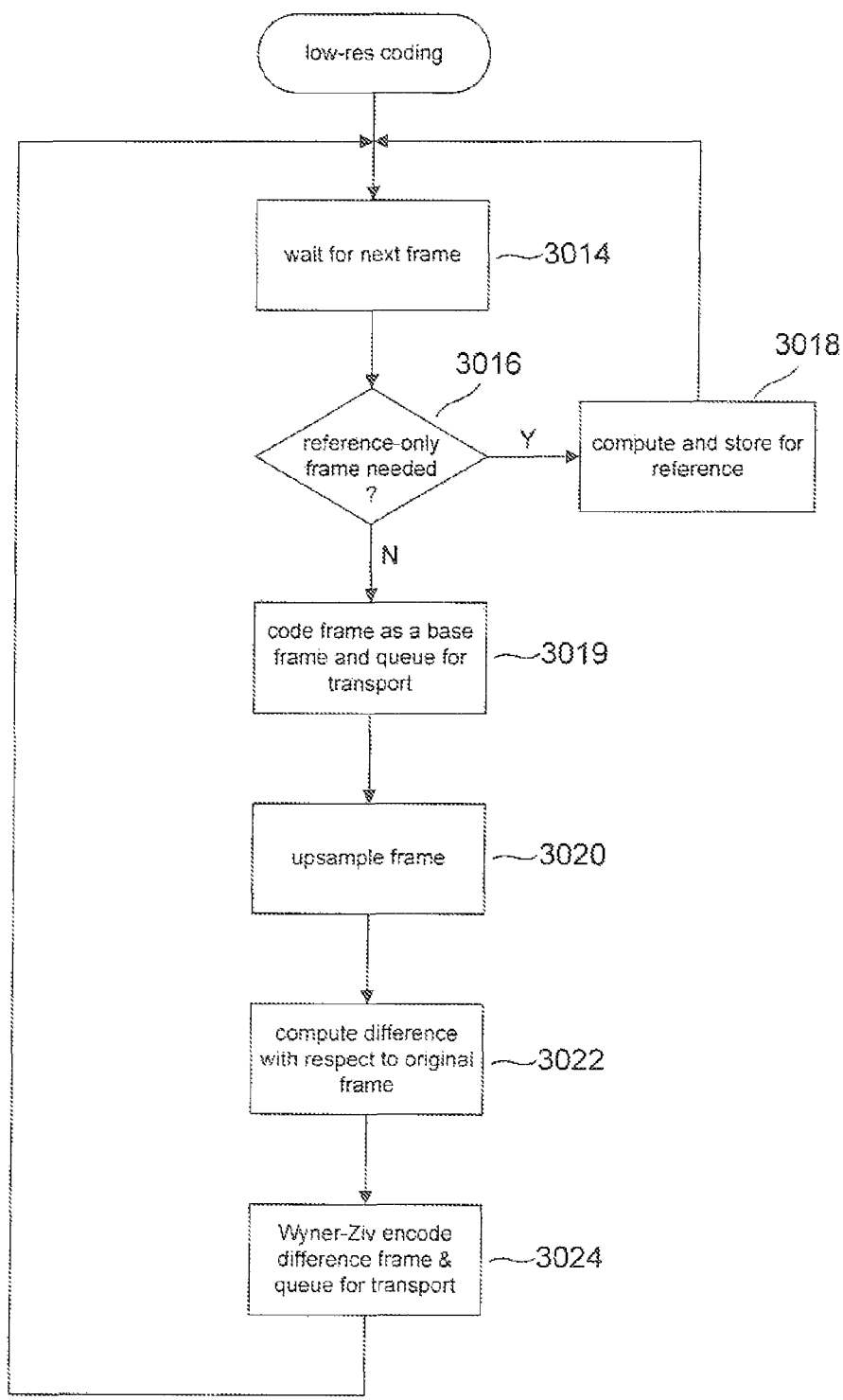

FIGS. 30A-F provide control-flow diagrams for an information-coding and coded-information-decoding method and system that represents one embodiment of the present invention. FIG. 30A provides a control-flow diagram for an information-source event handler that represents one embodiment of the present invention. In step 3002, the information source carries out a synchronization process with other cameras or information sources in a wireless network of camera sensors, discussed above with reference to FIG. 20. In step 3004, the camera sensor waits for a next frame to be generated by a frame-generation subsystem within the camera sensor. Once the next frame is generated then, in step 3005, the frame is decimated, as discussed above with reference to FIG. 22. If the current frame is to be coded as a high-resolution frame, as determined in step 36 and as discussed above with reference to FIG. 24, then the current frame is queued to a high-resolution-coding queue in step 3007 and the decimated frame, generated in step 3005, is marked for use as a reference frame only, in step 3008. Otherwise, the decimated, low-resolution frame is marked for low-resolution coding, in step 3009. In step 3010, the decimated frame, marked either for reference only or for low-resolution coding, is queued to a low-resolution-coding queue. When it is time for a resynchronization operation, as determined in step 3011, then control returns to step 3002. Otherwise, control flows back in step 3004, where the camera sensor waits for a next frame to be generated.

FIG. 30A provides a control-flow diagram for handling of decimated frames queued to the low-resolution-coding queue, in step 3010 in FIG. 30A, by a camera sensor according to one embodiment of the present invention. In step 3014, the camera sensor coding logic waits for a next low-resolution frame to be queued to the low-resolution-coding queue. Once a next frame is available, the camera determines whether or not an intervening reference-only frame is needed, in step 3016. When an intervening reference-only frame is needed, then the needed reference frame is computed by decimating a corresponding, already decoded high-resolution frame and stored, in step 3018, in a sequence of low-resolution frames for subsequent access during low-resolution-frame coding. In step 3019, the next low-resolution frame is coded, by standard video-frame coding techniques, as a base frame, queued for transmission to the information sink, and, like reference-only low-resolution frames, is stored for reference during coding of subsequent low-resolution frames. Then, in step 3020, the reconstructed low-resolution frame, generated during coding, in step 3019, is upsampled. A difference is computed by subtracting, in pixel-by-pixel fashion, the upsampled constructed frame from the original high-resolution frame corresponding to the low-resolution frame upsampled to produce the upsampled frame in order to produce a Laplacian-residual frame, in step 3022. Finally, in step 3024, the Laplacian-residual frame is coded using Wyner-Ziv coding, as discussed above with reference of FIG. 24, and the coded frame is queued for transmission to the information sink. High-resolution frames selected, at regular intervals, as discussed above with reference to FIG. 24, are coded by standard coding techniques in a separate high-resolution-coding loop that is similar to the first five steps in the low-resolution coding loop provided in FIG. 30B.

Figure 30C:
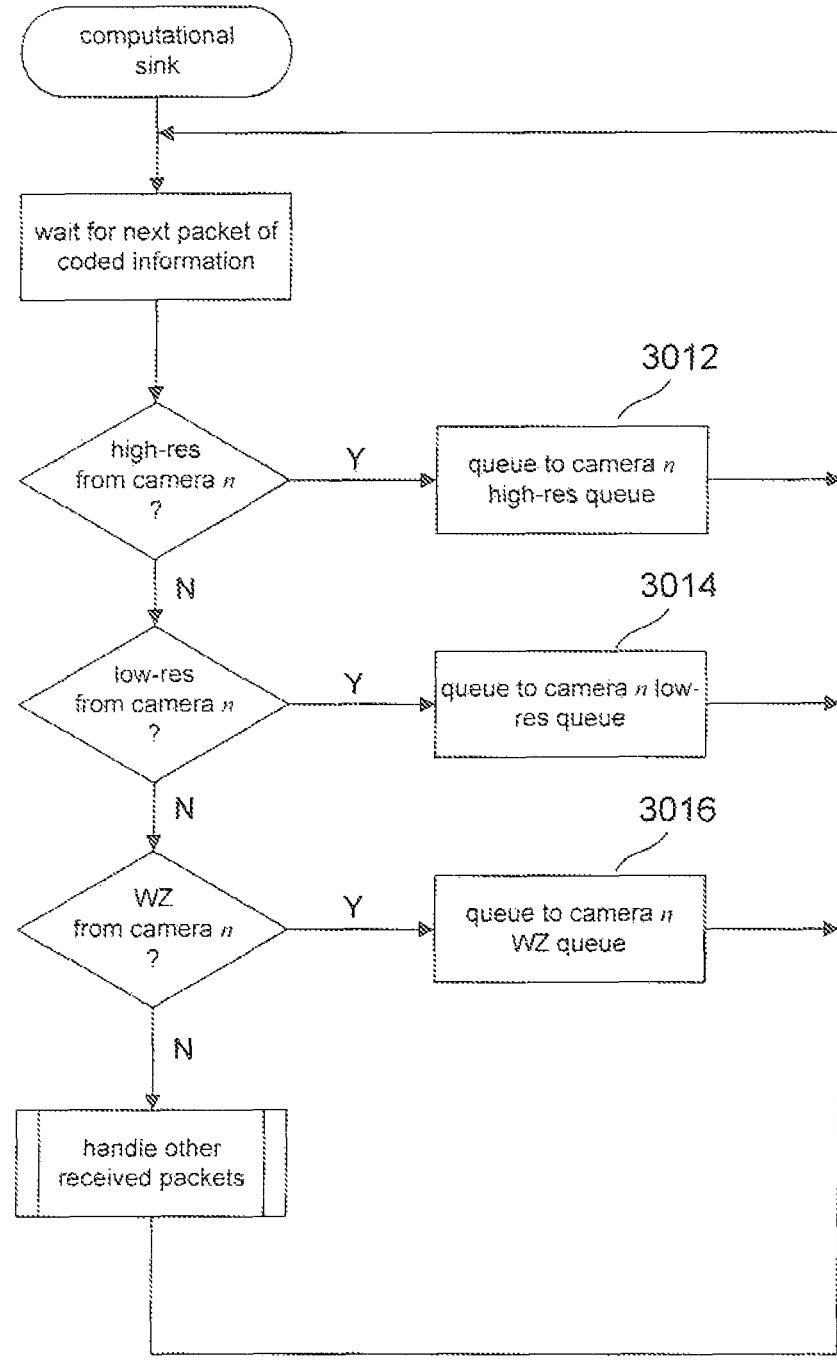

FIGS. 30C-F pertain to decoding of coded information by an information sink according to embodiments of the present invention. FIG. 30C provides a control-flow diagram for a high-level loop that is executed within the information sink to demultiplex a stream of coded information to information-source queues, as discussed above with reference to FIG. 29B. High-resolution coded information is queued to a high-resolution queue for a particular information source, in step 3012. Similarly, low-resolution coded information for a particular information source is queued to a corresponding low-resolution queue, in step 3014. Finally, WZ-coded information is queued to a WZ queue for a particular information source in step 3016.

Figure 30D:
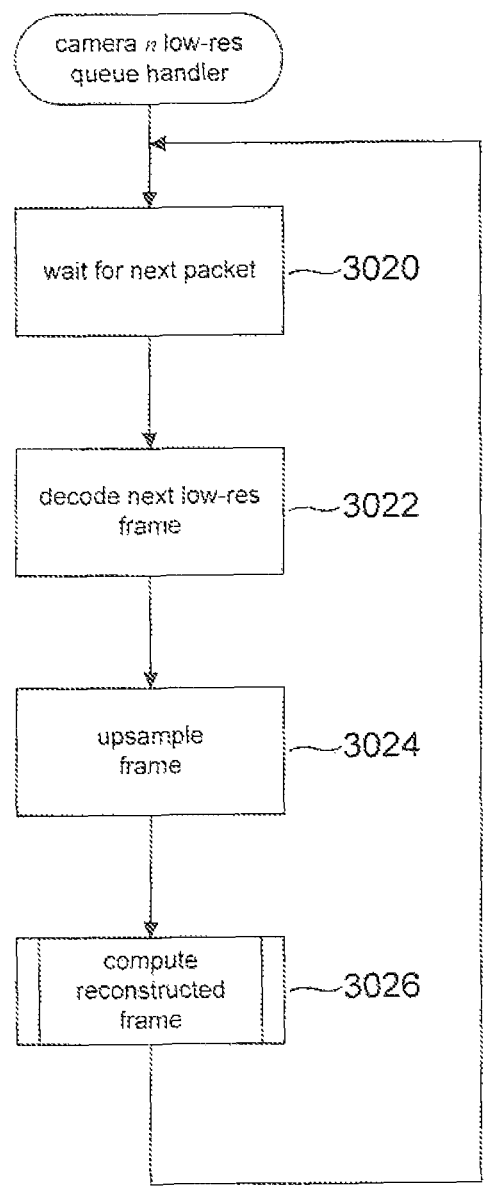

FIG. 30D provides a control-flow diagram for a low-resolution-queue handler for a particular information source within an information sink according to one embodiment of the present invention. In step 3020, the routine waits for a next coded low-resolution frame. In step 3022, the coded low-resolution frame is decoded using standard decoding techniques, as discussed above with reference to FIG. 24. The decoded low-resolution frame is upsampled, in step 3024, to produce an upsampled frame corresponding to the decoded low-resolution frame, as discussed above with reference to FIG. 25. Then, in step 3026, a reconstructed frame is computed from the upsampled frame according to the method discussed with reference to FIGS. 26 and 27.

Figure 30E:
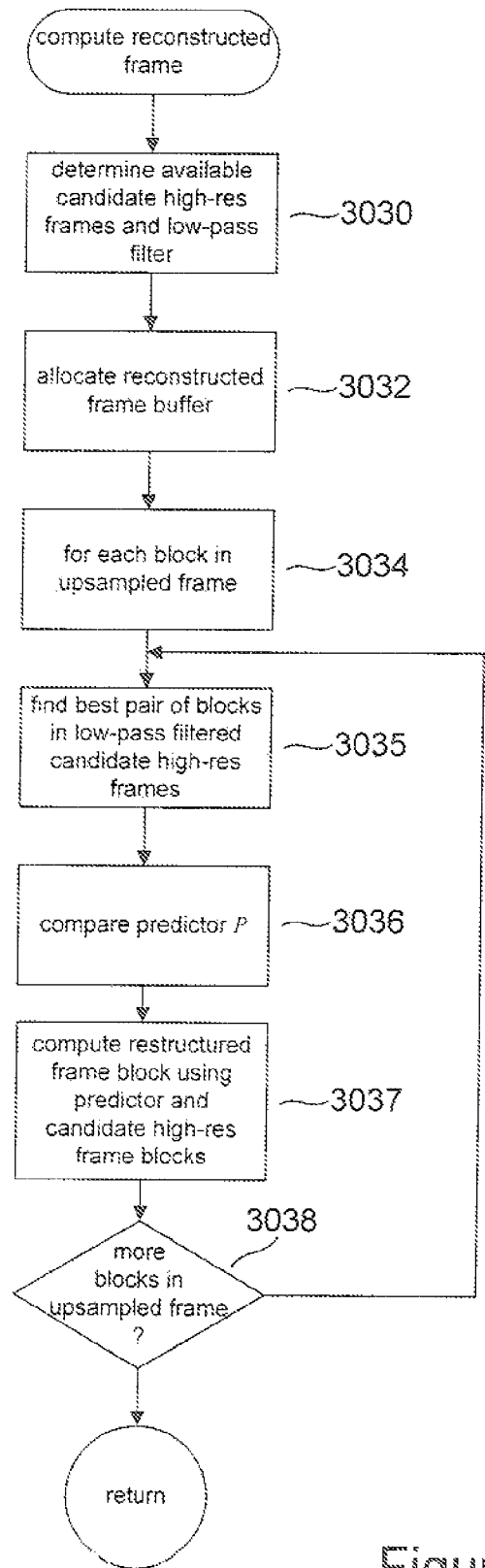

FIG. 30E provides a control-flow diagram for the routine "compute reconstructed frame" called in step 3026 of FIG. 30D. In step 3030, all of the candidate high-resolution frames for a currently-considered upsampled low-resolution frame are determined by searching already decoded high-resolution frames proximal, in time, to the currently-considered upsampled frame generated by a currently-considered information source and, in certain cases, by other information sources, as discussed above with reference to FIG. 26. In addition, the candidate frames are low-pass filtered, as also discussed above with reference to FIG. 26. In step 3032, a reconstructed frame buffer is allocated for a reconstructed frame corresponding to the upsampled frame generated in step 3024 of FIG. 30D. Then, in the for-loop comprising steps 3034-3038, each macroblock in the upsampled frame is considered. In the currently-considered upsampled-frame macroblock, the best pair of macroblocks in the low-pass-filtered candidate frames is found, using the SAD metric or another similarity metric, in step 3035. Then, as discussed above with reference to FIG. 27, a predictor is computed for the best pair of macroblocks in the currently-considered macroblock, in step 3036, as discussed above with reference to FIGS. 26 and 27. In step 3037, as discussed above with reference to FIG. 27, a restructured-frame macroblock is computed by applying the predictor, computed in step 3036, to macroblocks in high-resolution candidate frames corresponding to the best pair of macroblocks found in the low-pass-filtered candidate high-resolution frames, as also discussed above with reference to FIG. 27. The loop of steps 3034-3038 continues until a complete restructured frame has been computed.

Figure 30F:
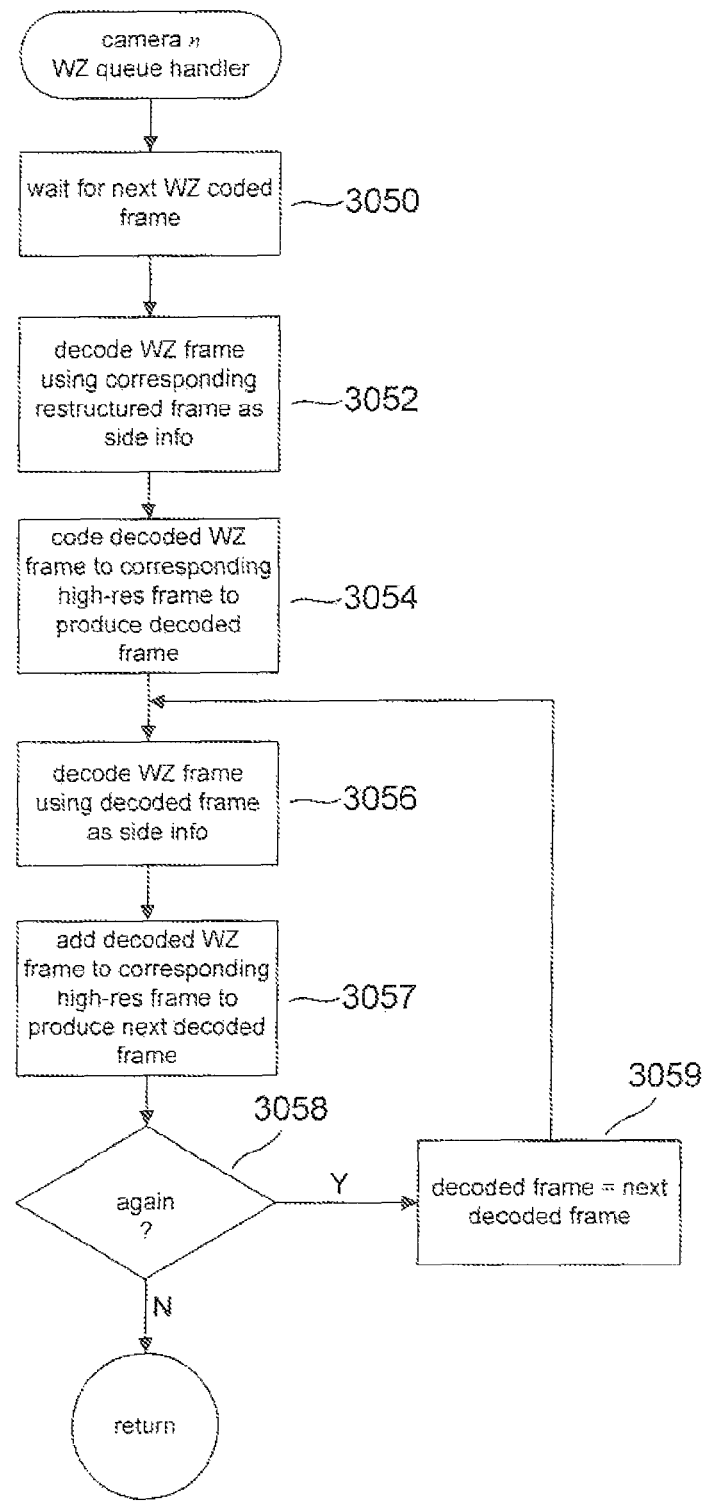

FIG. 30F provides a control-flow diagram for a WZ-queue handler that executes within an information sink according to one embodiment of the present invention. In step 3050, the routine waits for a next coded WZ-frame to be made available on the WZ-queue. In step 3052, the WZ-frame is decoded using Wyner-Ziv decoding and using the restructured frame, computed by the routine for which a control-flow diagram is provided in FIG. 30E, as side information. The decoded WZ-frame, a Laplacian-residual frame, is added to the corresponding decoded WZ-frame, coded in step 3022 of FIG. 30D, to produce a final decoded WZ-frame, in step 3054. Next, in the loops of steps 3056-3059, Wyner-Ziv decoding may be iteratively carried out several additional times using the decoded WZ-frame produced either in step 3054 or step 3059 as side information for another round of Wyner-Ziv decoding. A queue handler similar to that discussed with reference to FIG. 30D dequeues and decodes high-resolution frames.

The previously discussed control-flow diagrams are not meant to provide a detailed implementation. Coding and decoding of high-resolution frames is well-known, and is not described in a control-flow diagram, for example. In all cases, decoded frames are stored, in circular buffers, for use in decoding subsequent frames. Ultimately, these frames are overwritten or discarded once they are no longer needed for decoding other frames. The decoded WZ-frames and high-resolution frames are interleaved, for each information source, to produce a high-fidelity decoded version of the original frames captured by the information source. Depending on the particular application and implementation, the decoded video-frame sequences may be displayed, stored in memory, or processed to extract information or for coalescing into a composite video-frame sequence.

Although the present invention has been described in terms of particular embodiments, it is not intended that the invention be limited to these embodiments. Modifications will be apparent to those skilled in the art. For example, the mixed-resolution-information-stream coding and decoding method that represents one embodiment of the present invention can be implemented in software, hardware, or a combination of software and hardware by any of many different implementation strategies, which differ in a variety of implementation parameters, including choice of programming language, circuit-design language, modular organization, control structures, data structures, and other such implementation parameters. As discussed above, any of a variety of different predictors may be used for predicting macroblocks in order to generate restructured frames corresponding to upsampled, low-resolution frames. A variety of different techniques can be used to coalesce independently-coded information streams from a single information source and to coalesce aggregate information coded information streams from multiple information sources into a single coded information stream that is transmitted to an information sink. Alternatively, the information sink may receive independent coded-information streams from the various information sources. Many of these techniques rely on sophisticated networking protocols that have been implemented for transport of concurrent information streams from multiple sources. Any of various different standard video-frame coding and decoding techniques can be used for coding and decoding the high-resolution frames and low-resolution frames to produce the first two of three coded information streams generated by each information source. Method and system embodiments of the present invention can accommodate an arbitrary number of correlated and synchronized information sources. While the wireless-network camera-sensor environment discussed with reference to FIG. 20 is one example of an application domain for method and system embodiments of the present invention, method and system embodiments of the present invention can be applied to a wide variety of different problem domains, in which information sources produce correlated information streams in a synchronized manner. The level of synchronization may vary, from problem domain to problem domain, and strict coincidence, in time, and generation of coded information by the synchronized information sources is generally not required. While the discussed embodiments of the present invention code and decode images, method and system embodiments of the present invention may be applied to coding and decoding non-image information that can be coded both by a standard coding technique as well as by a Wyner-Ziv coding method.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method for coding, by an electronic device, a sequence of information blocks generated by one of multiple synchronized information sources that include the electronic device, the method comprising:
 performing an initial synchronization of the multiple synchronized information sources;
 determining, by the electronic device, a high-resolution block interval of time;
 for each information block generated by the one of multiple synchronized information sources, when the information block generated by the one of multiple synchronized information sources occurs at the high-resolution block interval within the sequence of information blocks, encoding the information block generated by the one of multiple synchronized information sources using a standard coding method, generating, by the electronic device, a corresponding low-resolution information block from the information block generated by the one of multiple synchronized information sources; and when the corresponding low-resolution information block does not occur at the high-resolution block interval within the sequence of information blocks generated by the one of multiple synchronized information sources, coding, by the electronic device, the low-resolution information block using a standard coding method, and coding, by the electronic device, a residual frame computed from the information block generated by the one of multiple synchronized information sources and the low-resolution block using a Wyner-Ziv coding method, wherein high-resolution frames are produced at regular intervals of time specified by the high-resolution block interval with one or more low-resolution frames between each of the high-resolution frames.

2. The method of claim 1 wherein determining, by the electronic device, a high-resolution block interval further comprising selecting, by the electronic device, the high-resolution block interval so that, within each interval of time during which the multiple synchronized information sources generate a next information block, at least one of the multiple synchronized information sources encodes an information block using a standard coding method.

3. The method of claim 1 wherein coding, by the electronic device, a residual frame computed from the information block and the low-resolution block using a Wyner-Ziv coding method further comprises:
upsampling, by the electronic device, a reconstructed information block generated by the standard coding method to produce an upsampled frame; and
computing, by the electronic device, the residual frame from the upsampled frame and the information block.

4. The method of claim 1 wherein the information blocks are images captured by a camera-sensor.

5. The method of claim 1 wherein standard coding methods include non-Wyner-Ziv coding methods, including:
MPEG-1;
MPEG-2;
MPEG-4;
H.263: and
H.264.

6. A system that codes a sequence of information blocks generated by one of multiple synchronized information sources, the system comprising:
an information-block-generating component, wherein the information blocks are generated by the one of multiple synchronized information sources;
an information-block-coding component that
determines a high-resolution block interval of time;
for each information block generated by the one of multiple synchronized information sources,
when the information block generated by the one of multiple synchronized information sources occurs at the high-resolution block interval within the sequence of information blocks, encodes the information block generated by the one of multiple synchronized information sources using a standard coding method,
generates a corresponding low-resolution information block from the information block generated by the one of multiple synchronized information sources; and
when the corresponding low-resolution information block does not occur at the high-resolution block interval within the sequence of information blocks generated by the one of multiple synchronized information sources,
codes the low-resolution information block using a standard coding method, and
codes a residual frame computed from the information block generated by the one of multiple synchronized information sources and the low-resolution block using a Wyner-Ziv coding method, wherein high-resolution frames are produced at regular intervals of time specified by the high-resolution block interval with one or more low-resolution frames between each of the high-resolution frames.

7. The system of claim 6, wherein the system includes a camera sensor and the information blocks are images captured by the camera sensor.

8. The method of claim 1 further comprising:
performing re-synchronizing operations such that the sequence of information blocks emitted by the multiple synchronized information sources are aligned with one another.

9. The method of claim 8 wherein the re-synchronizing operations occur periodically.

10. The system of claim 6 further comprising:
a synchronization mechanism to perform re-synchronizing operations such that video-frame sequences emitted by the multiple synchronized information sources are temporally aligned with one another.

11. The system of claim 10 wherein the re-synchronizing operations occur periodically.

* * * * *

UNITED STATES PATENT AND TRADEMARK OFFICE
CERTIFICATE OF CORRECTION

PATENT NO. : 8,699,565 B2
APPLICATION NO. : 12/549091
DATED : April 15, 2014
INVENTOR(S) : Mukherjee Page 1 of 1

It is certified that error appears in the above-identified patent and that said Letters Patent is hereby corrected as shown below:

In the Claims

Column 23, line 53, Claim 5, delete "H.263: and" and insert -- H.263; and --, therefor.

Signed and Sealed this
Seventh Day of October, 2014

Michelle K. Lee
*Deputy Director of the United States Patent and Trademark Office*